(12) United States Patent
Kefayati et al.

(10) Patent No.: US 12,008,804 B2
(45) Date of Patent: Jun. 11, 2024

(54) TRANSFERRING DATA BETWEEN DIFFERENT FREQUENCY BANDS

(71) Applicants: Mohammad Hadi Kefayati, Karaj (IR); Vahid Pourahmadi, Tehran (IR)

(72) Inventors: Mohammad Hadi Kefayati, Karaj (IR); Vahid Pourahmadi, Tehran (IR)

(*) Notice: Subject to any disclaimer, the term of this patent is extended or adjusted under 35 U.S.C. 154(b) by 423 days.

(21) Appl. No.: 17/510,305

(22) Filed: Oct. 25, 2021

(65) Prior Publication Data

US 2022/0044042 A1 Feb. 10, 2022

Related U.S. Application Data

(60) Provisional application No. 63/105,368, filed on Oct. 26, 2020.

(51) Int. Cl.
  *G06K 9/00* (2022.01)
  *G06N 3/04* (2023.01)
  (Continued)

(52) U.S. Cl.
  CPC ............ *G06V 10/95* (2022.01); *G06N 3/04* (2013.01); *G06N 3/08* (2013.01); *G06T 3/4046* (2013.01); *G06T 7/194* (2017.01); *G06T 7/55* (2017.01); *G06V 20/46* (2022.01); *H01Q 21/0025* (2013.01); *H04B 7/0469* (2013.01); *H04L 25/0204* (2013.01); *G06T 2207/10016* (2013.01); *G06T 2207/20081* (2013.01);
  (Continued)

(58) Field of Classification Search
  CPC .......... G06V 10/95; G06V 20/46; G06N 3/04; G06N 3/08; G06T 3/4046; G06T 7/194; G06T 7/55; G06T 2207/10016; G06T 2207/20081; G06T 2207/20084; G06T 2207/20224; H01Q 21/0025; H04B 7/0469; H04L 25/0204
  USPC ........................................................ 382/157
  See application file for complete search history.

(56) References Cited

U.S. PATENT DOCUMENTS

2020/0191913 A1* 6/2020 Zhang ..................... G01S 7/412

OTHER PUBLICATIONS

Kato, Sorachi, et al. "CSI2Image: Image reconstruction from channel state information using generative adversarial networks." IEEE Access 9 (2021): 47154-47168. (Year: 2021).*

(Continued)

*Primary Examiner* — Jonathan S Lee
(74) *Attorney, Agent, or Firm* — Bajwa IP Law Firm; Haris Zaheer Bajwa

(57) ABSTRACT

A method for generating a data sample in a first frequency band from measurements in a second frequency band. The method includes obtaining a first plurality of samples, obtaining a second plurality of samples, obtaining a mapping model based on the first plurality of samples and the second plurality of samples, obtaining a third plurality of samples, and obtaining the data sample based on the mapping model and the third plurality of samples. Obtaining the first plurality of samples includes measuring a first frequency response of an environment in the first frequency band. Obtaining the second plurality of samples includes measuring a second frequency response of the environment in the second frequency band. Obtaining the third plurality of samples includes measuring a third frequency response of the environment in the second frequency band. Obtaining the data sample includes applying the mapping model on the third plurality of samples.

20 Claims, 18 Drawing Sheets

100

(51) Int. Cl.
*G06N 3/08* (2023.01)
*G06T 3/4046* (2024.01)
*G06T 7/194* (2017.01)
*G06T 7/55* (2017.01)
*G06V 10/94* (2022.01)
*G06V 20/40* (2022.01)
*H01Q 21/00* (2006.01)
*H04B 7/0456* (2017.01)
*H04L 25/02* (2006.01)

(52) U.S. Cl.
CPC .............. *G06T 2207/20084* (2013.01); *G06T 2207/20224* (2013.01)

(56) References Cited

OTHER PUBLICATIONS

Kefayati, Mohammad Hadi, Vahid Pourahmadi, and Hassan Aghaeinia. "Wi2Vi: Generating Video Frames from WiFi CSI Samples." arXiv preprint arXiv:2001.05842 (2019). (Year: 2019).*

* cited by examiner

116

118

106

TRANSFERRING DATA BETWEEN DIFFERENT FREQUENCY BANDS

CROSS-REFERENCE TO RELATED APPLICATION

This application claims the benefit of priority from U.S. Provisional Patent Application Ser. No. 63/105,368, filed on Oct. 26, 2020, and entitled "SYSTEM AND METHOD FOR TRANSFERRING INFORMATION COLLECTED FROM MEASUREMENTS OR OBSERVATIONS IN ONE FREQUENCY SUBBAND INTO ANOTHER DOMAIN," which is incorporated herein by reference in its entirety.

TECHNICAL FIELD

The present disclosure generally relates to imaging, and particularly, to imaging by wireless communication systems and machine learning models.

BACKGROUND

Information about characteristics of an event is generally obtained by measuring physical properties of an environment of interest. For example, information is obtained by measuring various responses of an environment to electromagnetic or mechanical waves in different frequency bands. However, measurement in specific frequency bands is not possible in many practical cases. Therefore, a method for transferring information from measurements in one frequency band to another is beneficial. Among conventional systems, sonar systems measure environments in ultrasonic frequency band, radar systems measure environment in radio frequency band, and cameras measure environment in visible light frequency band. Then, images with different characteristics are generated from measurements in various frequency bands. Conventional methods measure an environment in a specific frequency band and do not use information in other frequency bands. However, obtained measurements in different frequency bands are correlated because measurements entail information obtained from a single environment. Correlation between measurements in different frequency bands is not utilized in conventional methods. As a result, a quality of generated images by conventional methods is limited by characteristics of chosen frequency band for measurement. In addition, when measurement instruments fail to measure environment in a specific frequency band, conventional methods fail to provide information about physical properties of environment such as existing objects or people in environment. Furthermore, conventional methods do not translate information from one frequency band to another. As a result, when measurement in one frequency band is not practical, a performance of conventional methods may be degraded. For example, when a closed-circuit television in surveillance systems fails to provide video frames, service of surveillance systems may be stopped, exposing environment of interest to potential risks.

There is, therefore, a need for an imaging method that generates images from measurements in more than one frequency band. There is also a need for a mapping model that translates measured information or data in one frequency band to information or data in another frequency band.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for generating a data sample in a first frequency band from measurements in a second frequency band. An exemplary method may include obtaining a first plurality of samples in the first frequency band, obtaining a second plurality of samples in the second frequency band, obtaining a mapping model based on the first plurality of samples and the second plurality of samples, obtaining a third plurality of samples in the second frequency band, and obtaining the data sample based on the mapping model and the third plurality of samples. In an exemplary embodiment, the first plurality of samples may be obtained utilizing a first measuring system. In an exemplary embodiment, obtaining the first plurality of samples may include measuring a first frequency response of an environment in the first frequency band. In an exemplary embodiment, the second plurality of samples may be obtained utilizing a second measuring system. In an exemplary embodiment, obtaining the second plurality of samples may include measuring a second frequency response of the environment in the second frequency band. In an exemplary embodiment, the mapping model may be obtained utilizing one or more processors. In an exemplary embodiment, obtaining the third plurality of samples may include measuring a third frequency response of the environment in the second frequency band. In an exemplary embodiment, the data sample may be obtained utilizing the one or more processors. In an exemplary embodiment, obtaining the data sample may include applying the mapping model on the third plurality of samples.

In an exemplary embodiment, measuring the first frequency response may include capturing video data. Exemplary video data may be associated with a plurality of video frames. In an exemplary embodiment, the video data may be captured utilizing a video device. In an exemplary embodiment, the video data may be captured by capturing data of an $i^{th}$ video frame of the plurality of video frames in an $i^{th}$ time interval where $i \geq 1$. In an exemplary embodiment, measuring the second frequency response may include obtaining a first plurality of channel state information (CSI) samples. In an exemplary embodiment, the first plurality of CSI samples may be obtained utilizing the communication system. In an exemplary embodiment, obtaining the first plurality of CSI samples may include obtaining an $i^{th}$ subset of the first plurality of CSI samples in the $i^{th}$ time interval. In an exemplary embodiment, measuring the third frequency response may include obtaining a second plurality of CSI samples. In an exemplary embodiment, the second plurality of CSI samples may be obtained utilizing the communication system. In an exemplary embodiment, obtaining the data sample may include obtaining an image. An exemplary image may be obtained utilizing the one or more processors. In an exemplary embodiment, obtaining the image may include applying the mapping model on the second plurality of CSI samples.

In an exemplary embodiment, obtaining the $i^{th}$ subset of the first plurality of CSI samples may include transmitting a plurality of transmit signals, receiving a plurality of receive signals associated with the plurality of transmit signals, and generating the $i^{th}$ subset of the first plurality of CSI samples from the plurality of receive signals. In an exemplary embodiment, the plurality of transmit signals may be transmitted by a transmitter of the communication system. In an exemplary embodiment, the plurality of receive signals may be received by a receiver of the communication system.

In an exemplary embodiment, generating the $i^{th}$ subset of the first plurality of CSI samples may include obtaining a plurality of raw CSI samples and extracting the $i^{th}$ subset of the first plurality of CSI samples from the plurality of raw CSI samples. In an exemplary embodiment, the plurality of raw CSI samples may be obtained based on the plurality of receive signals. In an exemplary embodiment, extracting the $i^{th}$ subset of the first plurality of CSI samples may include compensating a phase offset of each of the plurality of raw CSI samples.

In an exemplary embodiment, transmitting the plurality of transmit signals may include transmitting each of the plurality of transmit signals in a respective sub-carrier of a plurality of sub-carriers and at a respective transmit moment of a plurality of transmit moments in the $i^{th}$ time interval. In an exemplary embodiment, each of the plurality of transmit signals may be transmitted by a respective transmit antenna of a plurality of transmit antennas. In an exemplary embodiment, the plurality of transmit antennas may be associated with the transmitter. In an exemplary embodiment, receiving the plurality of receive signals may include receiving each of the plurality of receive signals in a respective sub-carrier of the plurality of sub-carriers and at a respective receive moment of a plurality of receive moments in the $i^{th}$ time interval. In an exemplary embodiment, each of the plurality of receive signals may be received by a respective receive antenna of a plurality of receive antennas. In an exemplary embodiment, the plurality of receive antennas may be associated with the receiver.

In an exemplary embodiment, obtaining the plurality of raw CSI samples may include obtaining a CSI array of size $N_1 \times N_2 \times N_3$ where $N_1 = 2M_t M_r$, $M_t$ is a number of the plurality of transmit antennas, $M_r$ is a number of the plurality of receive antennas, $N_2$ is a number of the plurality of sub-carriers, and $N_3$ is a number of the plurality of receive moments. In an exemplary embodiment, obtaining the CSI array may include generating a plurality of CSI vectors and generating the CSI array from the plurality of CSI vectors. In an exemplary embodiment, each of the plurality of CSI vectors may be of size $$\frac{N_1}{2} \times 1.$$

In an exemplary embodiment, generating each of the plurality of CSI vectors may include estimating a respective multiple-input multiple output (MIMO) channel of a plurality of MIMO channels. In an exemplary embodiment, estimating each of the plurality of MIMO channels may include processing a respective subset of the plurality of receive signals. In an exemplary embodiment, each of the plurality of MIMO channels may include a wireless channel between the transmitter and the receiver in a respective sub-carrier of the plurality of sub-carriers and at a respective receive moment of the plurality of receive moments. In an exemplary embodiment, generating the CSI array may include setting each element in the CSI array to one of a real part or an imaginary part of a respective element in a respective CSI vector of the plurality of CSI vectors.

In an exemplary embodiment, obtaining the plurality of raw CSI samples may further include extracting a CSI sub-array from the CSI array. In an exemplary embodiment, the CSI sub-array may be of size $N_1 \times N_2 \times N_4$ where $1 \leq N_4 < N_3$. In an exemplary embodiment, extracting the CSI sub-array may include randomly selecting $N_4$ sub-arrays from the CSI array and generating the CSI sub-array from $N_4$ sub-arrays. In an exemplary embodiment, each of $N_4$ sub-arrays may be of size $N_1 \times N_2$. In an exemplary embodiment, $N_4$ sub-arrays may be randomly selected out of $N_3$ sub-arrays of size $N_1 \times N_2$ in the CSI array. In an exemplary embodiment, generating the CSI sub-array may include stacking $N_4$ sub-arrays.

In an exemplary embodiment, obtaining the mapping model may include training a neural network. In an exemplary embodiment, training the neural network may include initializing the neural network and repeating an iterative process until a termination condition is satisfied. In an exemplary embodiment, the neural network may be initialized with a plurality of initial weights. An exemplary iterative process may include extracting a training image from an output of the neural network, generating a plurality of updated weights, replacing the plurality of updated weights with the plurality of initial weights. In an exemplary embodiment, extracting the training image may include applying the neural network on the $i^{th}$ subset of the first plurality of CSI samples. In an exemplary embodiment, generating the plurality of updated weights may include minimizing a loss function of the training image and the $i^{th}$ video frame.

In an exemplary embodiment, applying the neural network on the $i^{th}$ subset of the first plurality of CSI samples may include obtaining a first plurality of feature maps, obtaining a second plurality of feature maps based on the first plurality of feature maps, obtaining a third plurality of feature maps based on the second plurality of feature maps, and upsampling the third plurality of feature maps. In an exemplary embodiment, obtaining the first plurality of feature maps may include applying a first plurality of convolutional layers of the neural network on the $i^{th}$ subset of the first plurality of CSI samples. In an exemplary embodiment, obtaining the second plurality of feature maps may include feeding the first plurality of feature maps to an input of a fully connected layer of the neural network. In an exemplary embodiment, obtaining the third plurality of feature maps may include applying a residual neural network (ResNet) of the neural network on the second plurality of feature maps.

In an exemplary embodiment, applying the first plurality of convolutional layers may include extracting the first plurality of feature maps from an output of a $(1, L_1)^{th}$ convolutional layer of the first plurality of convolutional layers where $L_1$ is a number of the first plurality of convolutional layers. In an exemplary embodiment, extracting the first plurality of feature maps may include obtaining a $(1, l_1+1)^{th}$ plurality of feature maps where $1 \leq l_1 \leq L_1$. In an exemplary embodiment, obtaining the $(1, l_1+1)^{th}$ plurality of feature maps may include generating a $(1, l_1)^{th}$ plurality of filtered feature maps, generating a $(1, l_1)^{th}$ plurality of normalized feature maps from the $(1, l_1)^{th}$ plurality of filtered feature maps, and generating the $(1, l_1+1)^{th}$ plurality of feature maps from the $(1, l_1)^{th}$ plurality of normalized feature maps. In an exemplary embodiment, generating the $(1, l_1)^{th}$ plurality of filtered feature maps may include applying a $(1, l_1)^{th}$ plurality of filters on a $(1, l_1)^{th}$ plurality of feature maps. In an exemplary embodiment, a $(1, 1)^{st}$ plurality of feature maps may include the $i^{th}$ subset of the first plurality of CSI samples. In an exemplary embodiment, generating the $(1, l_1)^{th}$ plurality of normalized feature maps may include applying an instance normalization process on the $(1, l_1)^{th}$ plurality of filtered feature maps. In an exemplary embodiment, the $(1, l_1+1)^{th}$ plurality of feature maps may include implementing a $(1, l_1)^{th}$ non-linear activation function on each of the $(1, l_1)^{th}$ plurality of normalized feature maps.

In an exemplary embodiment, obtaining the second plurality of feature maps may further include extracting an output vector from an output of the fully connected layer, generating a first latent feature map from the output vector, obtaining a second latent feature map based on the first latent feature map, obtaining a fourth plurality of feature maps based on the second latent feature map, and generating the second plurality of feature maps from the fourth plurality of feature maps. In an exemplary embodiment, generating the first latent feature map may include generating a matrix from a plurality of elements in the output vector. In an exemplary embodiment, obtaining the second latent feature map may include applying a padding process on the first latent feature map.

In an exemplary embodiment, obtaining the fourth plurality of feature maps may include applying a second plurality of convolutional layers of the neural network on the second latent feature map. In an exemplary embodiment, applying the second plurality of convolutional layers may include extracting the fourth plurality of feature maps from an output of a $(2, L_2)^{th}$ convolutional layer of the second plurality of convolutional layers where $L_2$ is a number of the second plurality of convolutional layers. In an exemplary embodiment, extracting the fourth plurality of feature maps may include obtaining a $(2, l_2+1)^{th}$ plurality of feature maps where $1 \le l_2 \le L_2$. In an exemplary embodiment, obtaining the $(2, l_2+1)^{th}$ plurality of feature maps may include generating a $(2, l_2)^{th}$ plurality of filtered feature maps, generating a $(2, l_2)^{th}$ plurality of normalized feature maps based on the $(2, l_2)^{th}$ plurality of filtered feature maps, and generating the $(2, l_2+1)^{th}$ plurality of feature maps based on the $(2, l_2)^{th}$ plurality of normalized feature maps. In an exemplary embodiment, generating the $(2, l_2)^{th}$ plurality of filtered feature maps may include applying a $(2, l_2)^{th}$ plurality of filters on a $(2, l_2)^{th}$ plurality of feature maps. In an exemplary embodiment, a $(2, 1)^{st}$ plurality of feature maps may include the second latent feature map. In an exemplary embodiment, generating the $(2, l_2)^{th}$ plurality of normalized feature maps may include applying the instance normalization process on the $(2, l_2)^{th}$ plurality of filtered feature maps. In an exemplary embodiment, generating the $(2, l_2+1)^{th}$ plurality of feature maps may include implementing a $(2, l_2)^{th}$ non-linear activation function on each of the $(2, l_2)^{th}$ plurality of normalized feature maps. In an exemplary embodiment, generating the second plurality of feature maps may include applying the padding process on each of the fourth plurality of feature maps.

In an exemplary embodiment, applying the ResNet may include applying a plurality of ResNet blocks on the second plurality of feature maps. In an exemplary embodiment, applying the plurality of ResNet blocks may include extracting the third plurality of feature maps from an output of an $L_r^{th}$ ResNet block of the plurality of ResNet blocks where $L_r$ is a number of the plurality of ResNet blocks. In an exemplary embodiment, extracting the third plurality of feature maps may include obtaining an $(l_r+1)^{th}$ plurality of residual feature maps. In an exemplary embodiment, extracting the third plurality of feature maps may include applying an $l_r^{th}$ ResNet block of the plurality of ResNet blocks on an $l_r^{th}$ plurality of residual feature maps where $1 \le l_r \le L_r$. In an exemplary embodiment, a first plurality of residual feature maps may include the second plurality of feature maps. In an exemplary embodiment, the $l_r^{th}$ ResNet block may include two cascaded convolutional layers and a residual connection.

In an exemplary embodiment, upsampling the third plurality of feature maps may include extracting the training image from an output of a $(3, L_3)^{th}$ convolutional layer of a third plurality of convolutional layers of the neural network where $L_3$ is a number of the third plurality of convolutional layers. In an exemplary embodiment, extracting the training image may include obtaining a $(3, l_3+1)^{th}$ plurality of feature maps where $1 \le l_3 \le L_3$. In an exemplary embodiment, obtaining the $(3, l_3+1)^{th}$ plurality of feature maps may include generating an $l_3^{th}$ plurality of upsampled feature maps, generating a $(3, l_3)^{th}$ plurality of filtered feature maps from the $l_3^{th}$ plurality of upsampled feature maps, generating a $(3, l_3)^{th}$ plurality of normalized feature maps from the $(3, l_3)^{th}$ plurality of filtered feature maps, and generating the $(3, l_3+1)^{th}$ plurality of feature maps from $(3, l_3)^{th}$ plurality of normalized feature maps. In an exemplary embodiment, generating the $l_3^{th}$ plurality of upsampled feature maps may include implementing an upsampling process on a $(3, l_3)^{th}$ plurality of feature maps. In an exemplary embodiment, a $(3, 1)^{st}$ plurality of feature maps may include the third plurality of feature maps. In an exemplary embodiment, generating the $(3, l_3)^{th}$ plurality of filtered feature maps may include applying a $(3, l_3)^{th}$ plurality of filters on the $l_3^{th}$ plurality of upsampled feature maps. In an exemplary embodiment, generating the $(3, l_3)^{th}$ plurality of normalized feature maps may include applying the instance normalization process on the $(3, l_3)^{th}$ plurality of filtered feature maps. In an exemplary embodiment, generating the $(3, l_3+1)^{th}$ plurality of feature maps may include implementing a $(3, l_3)^{th}$ non-linear activation function on each of the $(3, l_3)^{th}$ plurality of normalized feature maps.

In an exemplary embodiment, minimizing the loss function may include obtaining a mask image, obtaining a background-subtracted image based on the mask image, and minimizing the loss function of the training image and the background-subtracted image. In an exemplary embodiment, obtaining the mask image may include extracting a plurality of masks from the $i^{th}$ video frame. In an exemplary embodiment, each of the plurality of masks may be associated with a respective dynamic object of a plurality of dynamic objects in the $i^{th}$ video frame. In an exemplary embodiment, obtaining the background-subtracted image may include multiplying the mask image by the $i^{th}$ video frame.

Other exemplary systems, methods, features and advantages of the implementations will be, or will become, apparent to one of ordinary skill in the art upon examination of the following FIGURES and detailed description. It is intended that all such additional systems, methods, features and advantages be included within this description and this summary, be within the scope of the implementations, and be protected by the claims herein.

BRIEF DESCRIPTION OF THE DRAWINGS

The drawing FIGURES depict one or more implementations in accord with the present teachings, by way of example only, not by way of limitation. In the FIGURES, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and system for generating an image from channel state information (CSI) samples in a communication system. An exemplary CSI sample may be referred to as channel properties of a communication link. An exemplary CSI sample may describe how a signal propagates from a transmitter to a receiver and represents a combined effect of scattering, fading, and power decay with distance. An exemplary method may include training a neural network to map CSI samples of a wireless channel to video data associated with video frames captured from an environment of the wireless channel. An exemplary video device may capture video data that are converted to a number of video frames and simultaneously a communication system may estimate CSI samples of the wireless channel. Next, an exemplary neural network may be trained for mapping CSI samples to video frames. An exemplary trained neural network may then be utilized for generating images from CSI samples. Generated images may be substituted with video frames to resolve a need for a video device or may be combined with video frames to achieve more information about an environment such as existing objects or people in the environment.

Figure 1A:
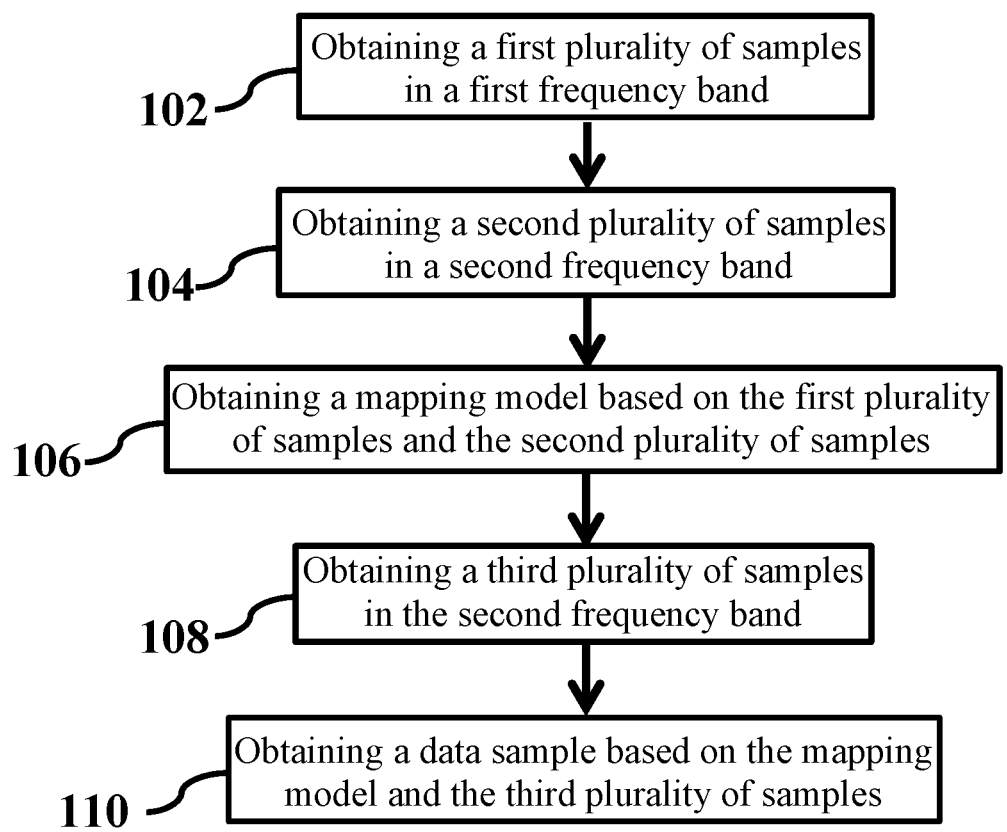
FIG. 1A shows a flowchart of a method for generating a data sample in a first frequency band from measurements in a second frequency band, consistent with one or more exemplary embodiments of the present disclosure.

FIG. 1A shows a flowchart of a method for generating a data sample in a first frequency band from measurements in a second frequency band, consistent with one or more exemplary embodiments of the present disclosure. In an exemplary embodiment, a method 100 may include capturing obtaining a first plurality of samples in a first frequency band (step 102), obtaining a second plurality of samples in a second frequency band (step 104), obtaining a mapping model based on the first plurality of samples and the second plurality of samples (step 106), obtaining a third plurality of samples in the second frequency band (step 108), and obtaining the data sample based on the mapping model and the third plurality of samples (step 110).

Figure 2:
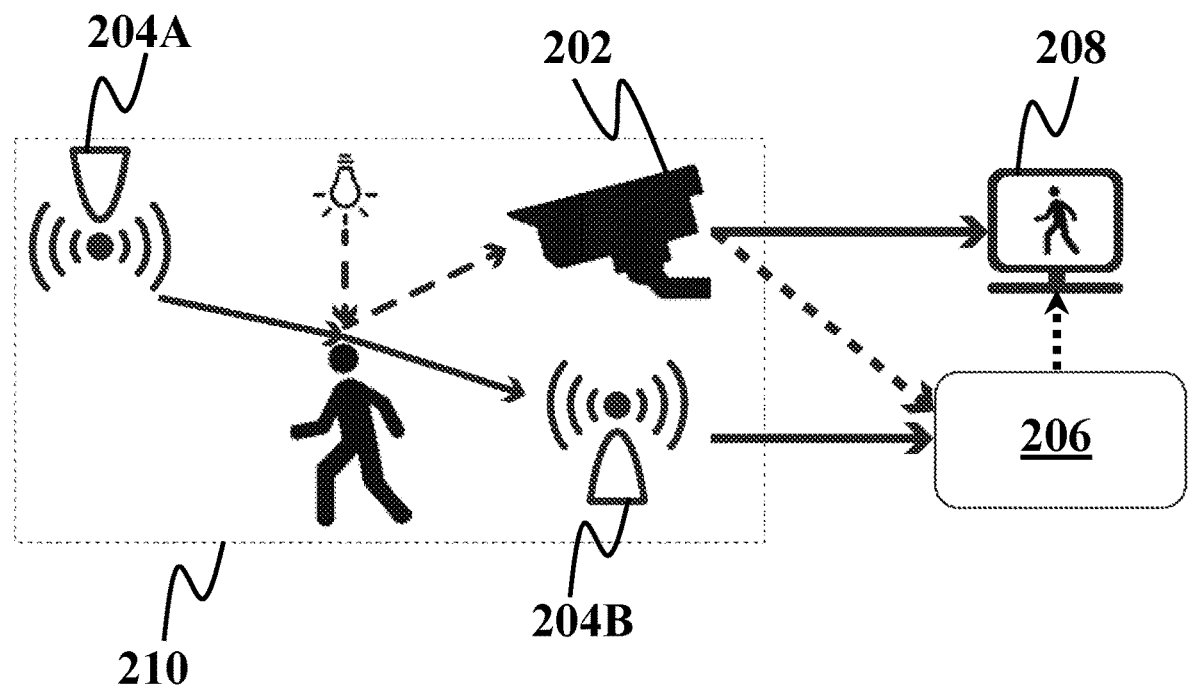
FIG. 2 shows a schematic of a system for generating a data sample in a first frequency band from measurements in a second frequency band, consistent with one or more exemplary embodiments of the present disclosure.

FIG. 2 shows a schematic of a system for generating a data sample in a first frequency band from measurements in a second frequency band, consistent with one or more exemplary embodiments of the present disclosure. In an exemplary embodiment, different steps of method 100 may be implemented utilizing a system 200. In an exemplary embodiment, system 200 may include a video device 202, a communication system 204, and a processor 206. In an exemplary embodiment, communication system 204 may include a transmitter 204A and a receiver 204B. In an exemplary embodiment, video device 202 may provide processor 206 with video data. Exemplary video data may be converted to a plurality of video frames. In an exemplary embodiment, communication system 204 may provide processor 206 with a first plurality of CSI samples. In an exemplary embodiment, receiver 204B may obtain the first plurality of CSI samples and may send the first plurality of CSI samples to processor 206. Then, in an exemplary embodiment, processor 206 may obtain a mapping model for translating information in the first plurality of CSI samples to information in the plurality of video frames. In an exemplary embodiment, after obtaining the mapping model, processor 206 may generate an image 208 from a second plurality of CSI samples. In an exemplary embodiment, processor 206 may generate image 208 as a supplement or a substitute of video frames captured from video device 202 in different operating scenarios. In an exemplary embodiment, in a normal operating scenario, image 208 may be combined with a video frame obtained by video device 202 for extracting more information from an environment 210. In an exemplary embodiment, in a critical operating scenario, when video device 202 fails to capture video data associated with video frames from environment 210, processor 206 may substitute images captured from video device 202 and may utilize generated image 208 to transmit to monitor environment 210.

Figure 3:
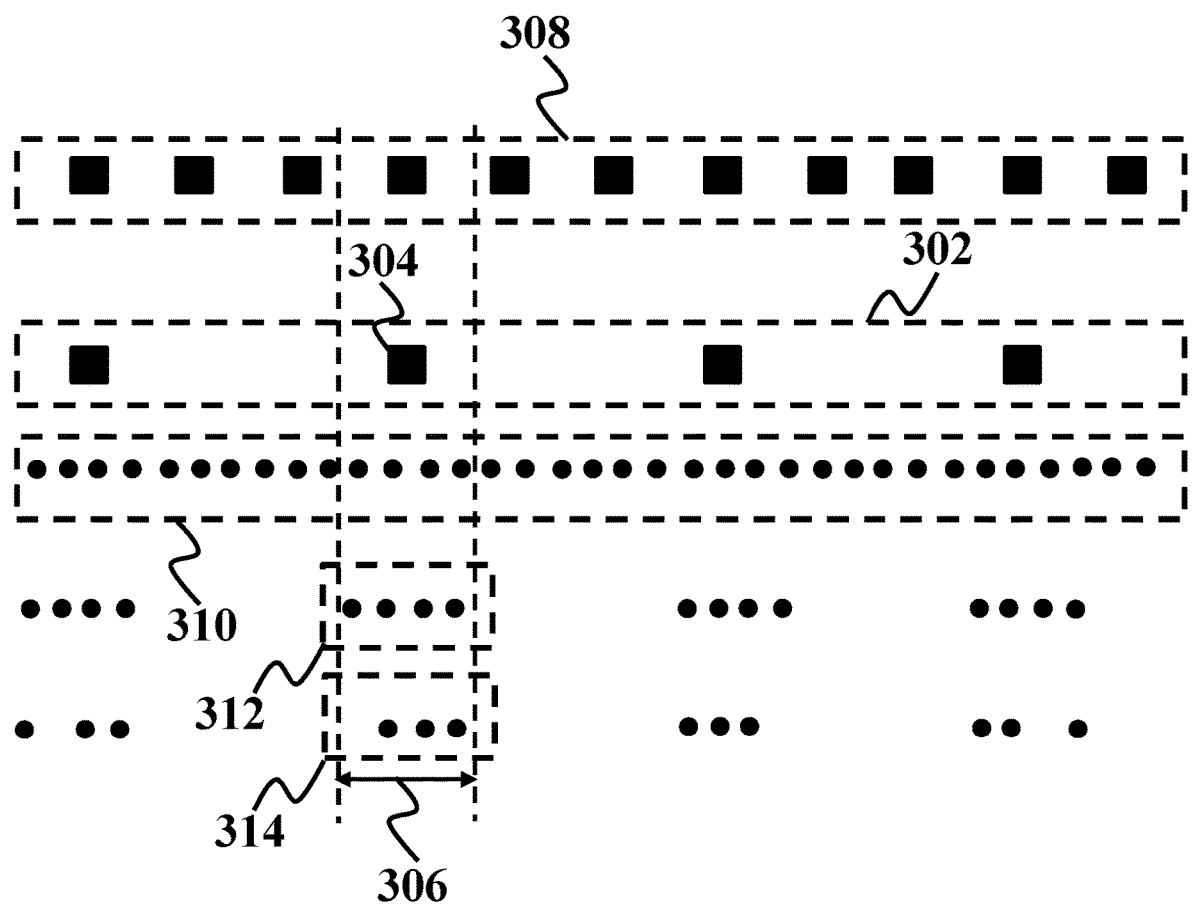
FIG. 3 shows a schematic of a plurality of video frames and a plurality of CSI samples, consistent with one or more exemplary embodiments of the present disclosure.

For further detail with respect to step 102, FIG. 3 shows a schematic of a plurality of video frames and a plurality of CSI samples, consistent with one or more exemplary embodiments of the present disclosure. Referring to FIGS. 1A, 2A, and 3, in an exemplary embodiment, step 102 may include obtaining the first plurality of samples. In an exemplary embodiment, the first plurality of samples may be obtained utilizing a first measuring system. In an exemplary embodiment, obtaining the first plurality of samples may include measuring a first frequency response of environment 210 in the first frequency band. In an exemplary embodiment, the first measuring system may include video device 202. In an exemplary embodiment, the first frequency band may include a visible light frequency range. In an exemplary embodiment, measuring the first frequency response may include capturing a plurality of video frames 302. In an exemplary embodiment, video data associated with plurality of video frames 302 may be captured utilizing video device 202. In an exemplary embodiment, video device 202 may include a camera. An exemplary camera may capture a scene of environment 210. An exemplary camera may be fixed at a place in environment 210 and may capture video data. Exemplary video data may be converted into plurality of video frames 302 utilizing a video codec of the camera. Exemplary video data may be stored utilizing a video codec in different video coding formats such as H.262, MPEG 4 Visual, H.264, and HEVC. In an exemplary embodiment, video data associated with plurality of video frames 302 may be captured by capturing video data associated with an $i^{th}$ video frame 304 of plurality of video frames 302 in an $i^{th}$ time interval 306 where i≥1. In an exemplary embodiment, a frame rate of video device 202 may be high, compared with movements of objects in environment 210. As a result, in an exemplary embodiment, movement of objects in consecutive video frames captured by video device 202 may not be observable. In an exemplary embodiment, video data associated with a plurality of video frames 308 captured in small-time intervals may be discarded to reduce a computational complexity of method 100, that is, plurality of video frames 302 may be obtained by temporal downsampling plurality of video frames 308. In an exemplary embodiment, video frames captured by video device 202 may include color images. In an exemplary embodiment, color images may be transferred to grayscale images. In an exemplary embodiment, each of plurality of video frames 302 may include a respective grayscale image. In an exemplary embodiment, video data associated with video frames captured by video device 202 may be of large size, resulting in high computational complexity for obtaining the mapping model. To prevent high computational complexity, in an exemplary embodiment, video frames may be resized to a smaller size.

Figure 1B:
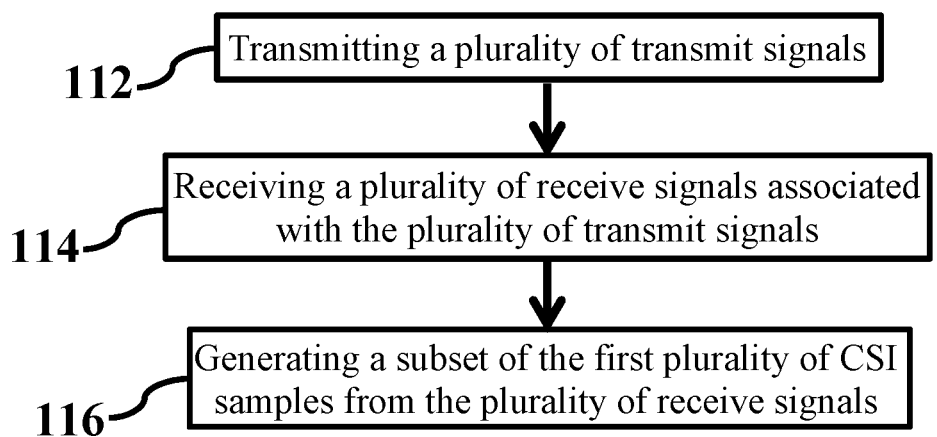
FIG. 1B shows a flowchart for obtaining a first plurality of channel state information (CSI) samples, consistent with one or more exemplary embodiments of the present disclosure.

In further detail with regard to step 104, FIG. 1B shows a flowchart for obtaining a first plurality of CSI samples, consistent with one or more exemplary embodiments of the present disclosure. Referring to FIGS. 1B, 2A and 3, in an exemplary embodiment, step 104 may include obtaining the second plurality of samples. In an exemplary embodiment, the second plurality of samples may be obtained utilizing a second measuring system. In an exemplary embodiment, obtaining the second plurality of samples may include measuring a second frequency response of environment 210 in the second frequency band. In an exemplary embodiment, the second measuring system may include communication system 204. In an exemplary embodiment, the second frequency band may include a microwave frequency range. In an exemplary embodiment, measuring the second plurality of samples may include obtaining a first plurality of CSI samples 310 may be obtained utilizing communication system 204. Specifically, in an exemplary embodiment, first plurality of CSI samples 310 may be obtained from receiver 204B. In an exemplary embodiment, obtaining first plurality of CSI samples 310 may include obtaining an $i^{th}$ subset 312 of first plurality of CSI samples 310 in time interval 306. In an exemplary embodiment, obtaining subset 312 may include transmitting a plurality of transmit signals (step 112), receiving a plurality of receive signals associated with the plurality of transmit signals (step 114), and generating subset 312 from the plurality of receive signals (step 116).

In an exemplary embodiment, step 112 may include transmitting the plurality of transmit signals. In an exemplary embodiment, the plurality of transmit signals may be transmitted to obtain subset 312. In an exemplary embodiment, the plurality of transmit signals may be transmitted by transmitter 204A. In an exemplary embodiment, communication system 204 may include an orthogonal frequency division multiplexing (OFDM) communication system. In an exemplary embodiment, transmitter 204A may transmit each of the plurality of transmit signals in a respective resource block, that is, in a respective sub-carrier and in a respective time frame. In an exemplary embodiment, transmitting the plurality of transmit signals may include transmitting each of the plurality of transmit signals in a respective sub-carrier of a plurality of sub-carriers and at a respective transmit moment of a plurality of transmit moments in time interval 306. Exemplary plurality of transmit signals may include a plurality of packets. Exemplary plurality of packets may be transmitted by transmitting the plurality of transmit signals. In an exemplary embodiment, each packet may include a respective preamble. In an exemplary embodiment, each of the plurality of packets may be transmitted in a respective sub-carrier and at a respective transmit moment. In an exemplary embodiment, transmitter 204A may include an access point of a Wi-Fi system. An exemplary access point may transmit signals according to an OFDM Wi-Fi standard such as 802.11a, 802.11n, and 802.11g. An exemplary access point may successively transmit signals in a series of transmit moments. An exemplary transmit moment may refer to a time instant that transmitter 204A transmits a transmit signal. An exemplary Wi-Fi standard may determine the time interval between consecutive transmit moments. An exemplary OFDM Wi-Fi standard may determine a frequency band, a number of sub-carriers, and a format of each of the plurality of packets. In an exemplary embodiment, communication system 204 may include a multiple-input multiple-output (MIMO) communication system. In an exemplary embodiment, transmitter 204A may include a plurality of transmit antennas. In an exemplary embodiment, transmitter 204A may transmit each of the plurality of transmit signals by a respective transmit antenna of the plurality of transmit antennas. Each of exemplary transmit antennas may transmit a transmit signal according to a MIMO Wi-Fi standard such as 802.11n.

In an exemplary embodiment, step 114 may include receiving the plurality of receive signals. In an exemplary embodiment, the plurality of receive signals may be received by receiver 204B. In an exemplary embodiment, receiver 204B may include an access point of a Wi-Fi system. In an exemplary embodiment, the plurality of received signals may include a noisy version of the plurality of transmit signals, that is, the plurality of receive signals may include a summation of attenuated transmit signals and thermal noise. In an exemplary embodiment, communication system 204 may include an OFDM communication system. In an exemplary embodiment, receiver 204B may receive each of the plurality of receive signals in a respective resource block, that is, in a respective sub-carrier and in a respective time frame. In an exemplary embodiment, receiving the plurality of receive signals may include receiving each of the plurality of receive signals in a respective sub-carrier of the plurality of sub-carriers and at a respective receive moment of a plurality of receive moments in time interval 306. An exemplary access point may successively receive signals in a series of receive moments. An exemplary receive moment may refer to a time instant that receiver 204B receives a receive signal. In an exemplary embodiment, the plurality of packets may be received by receiving the plurality of receive signals. In an exemplary embodiment, each of the plurality of packets may be received in a respective sub-carrier and at a respective receive moment. In an exemplary embodiment, communication system 204 may include a MIMO communication system. In an exemplary embodiment, receiver 204B may include a plurality of receive antennas. In an exemplary embodiment, receiver 204B may receive each of the plurality of receive signals by a respective receive antennas of the plurality of receive antennas.

Figure 1C:
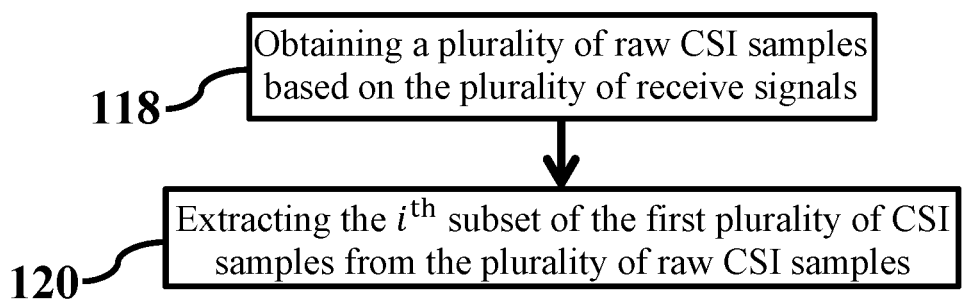
FIG. 1C shows a flowchart for generating a subset of a plurality of CSI samples, consistent with one or more exemplary embodiments of the present disclosure.

For further detail regarding step 116, FIG. 1C shows a flowchart for generating a subset of a plurality of CSI samples, consistent with one or more exemplary embodiments of the present disclosure. Referring to FIGS. 1C and 3, in an exemplary embodiment, generating subset 312 may include obtaining a plurality of raw CSI samples (step 118) and extracting subset 312 from the plurality of raw CSI samples (step 120). In an exemplary embodiment, subset 312 may include CSI samples that are obtained in time interval 306, that is, a time interval of capturing video data associated with video frame 304. In other words, in an exemplary embodiment, subset 312 may be obtained simultaneously with capturing video data associated with video frame 304.

Figure 1D:
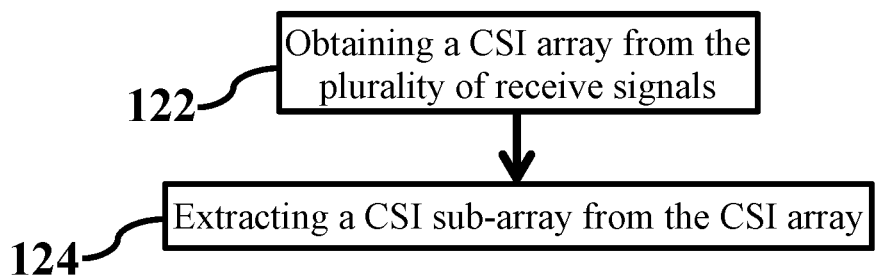
FIG. 1D shows a flowchart for obtaining a plurality of raw CSI samples, consistent with one or more exemplary embodiments of the present disclosure.

For further detail regarding step 118, FIG. 1D shows a flowchart for obtaining a plurality of raw CSI samples, consistent with one or more exemplary embodiments of the present disclosure. Referring to FIGS. 1D, 2A, and 3, in an exemplary embodiment, the plurality of raw CSI samples may be obtained based on the plurality of receive signals. In an exemplary embodiment, receiver 204B may process the plurality of receive signals and provide processor 206 with the plurality of raw CSI samples. In an exemplary receiver 204B, that is, a Wi-Fi access point, may process the plurality of receive signals according to channel estimation procedures defined by Wi-Fi standards such as 802.11n. Exemplary plurality of raw CSI samples may be referred to as an array of complex numbers representing attenuation and phase shift of receiver signals compared with respective transmit signals. In an exemplary embodiment, obtaining the plurality of raw CSI samples may include obtaining a CSI array based on the plurality of receive signals (step 122) and extracting a CSI sub-array from the CSI array (step 124).

Figure 1E:
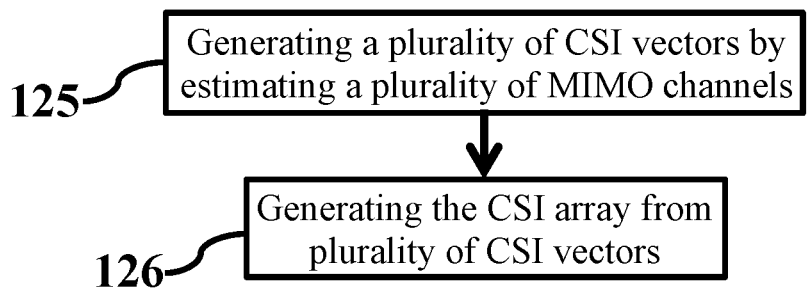
FIG. 1E shows a flowchart for obtaining a CSI array, consistent with one or more exemplary embodiments of the present disclosure.

For further detail with respect to step 122, FIG. 1E shows a flowchart for obtaining a CSI array, consistent with one or more exemplary embodiments of the present disclosure. In an exemplary embodiment, the CSI array may be of size $N_1 \times N_2 \times N_3$ where $N_1 = 2M_tM_r$, $M_t$ is a number of the plurality of transmit antennas, $M_r$ is a number of the plurality of receive antennas, $N_2$ is a number of the plurality of sub-carriers, and $N_3$ is a number of the plurality of receive moments. In an exemplary embodiment, obtaining the CSI array may include generating a plurality of CSI vectors (step 125) and generating the CSI array from the plurality of CSI vectors (step 126).

In an exemplary embodiment, step 125 may include generating a plurality of CSI vectors. In an exemplary embodiment, each of the plurality of CSI vectors may be of size $$\frac{N_1}{2} \times 1.$$

In an exemplary embodiment, generating each of the plurality of CSI vectors may include estimating a respective MIMO channel of a plurality of MIMO channels. In an exemplary embodiment, each of the plurality of MIMO channels may include a wireless channel between transmitter 204A and receiver 204B in a respective sub-carrier of the plurality of sub-carriers and at a respective receive moment of the plurality of receive moments. In an exemplary embodiment, estimating each of the plurality of MIMO channels may include processing a respective subset of the plurality of receive signals. In an exemplary embodiment, communication system 204 may include a Wi-Fi system. To measure CSI, an exemplary Wi-Fi transmitter (similar to transmitter 204A) may send long training symbols including pre-defined symbols for each subcarrier, in a respective packet preamble. In an exemplary embodiment, when long training symbols are received by a Wi-Fi receiver (similar to receiver 204B), the Wi-Fi receiver may estimate a CSI matrix in each sub-carrier and at a receive moment by processing the plurality of received signals and the original long training symbols. An exemplary processing procedure may be performed according to channel estimation procedures defined in Wi-Fi standards such as 802.11n. In an exemplary embodiment, a CSI of each of the plurality of MIMO channels may include a CSI matrix of size $M_r \times M_t$. In an exemplary embodiment, each of the plurality of CSI vectors may be obtained by stacking columns of a respective CSI matrix. As a result, in an exemplary embodiment, each of the plurality of CSI vectors may be of size $M_rM_t \times 1$, that is, $$\frac{N_1}{2} \times 1.$$

In an exemplary OFDM system, CSI matrices of MIMO channels in different sub-carriers and different moments may differ from each other. In an exemplary embodiment, each of the plurality of CSI vectors may include elements of a CSI matrix in a respective sub-carrier and at a respective moment. As a result, a number of the plurality of CSI vectors may be equal to $N_2 \times N_3$.

In an exemplary embodiment, step 126 may include generating the CSI array from the plurality of CSI vectors. In an exemplary embodiment, generating the CSI array may include separating real parts and imaginary parts of complex numbers in each of CSI vectors and obtain an expanded CSI vector by generating a vector including vectors of real parts alongside vectors of imaginary parts. As a result, in an exemplary embodiment, each element in the expanded CSI vector may include one of a real part or an imaginary part of a respective element in a respective CSI vector of the plurality of CSI vectors. Therefore, in an exemplary embodiment, a length of each expanded CSI vector is twice a length of each CSI vector. In an exemplary embodiment, since a length of each CSI vector is $$\frac{N_1}{2} \times 1,$$

a length of each expanded CSI vector may be equal to $N_1 \times 1$. In an exemplary embodiment, as described in details of step 122, a number of the plurality of CSI vectors may be equal to $N_2 \times N_3$. As a result, in an exemplary embodiment, the CSI array may be obtained by generating a 3D array of size $N_1 \times N_2 \times N_3$. An exemplary 3D array may include $N_2 \times N_3$ vectors. Each of exemplary vectors in the 3D array may be equal to a respective expanded CSI array.

Figure 1F:
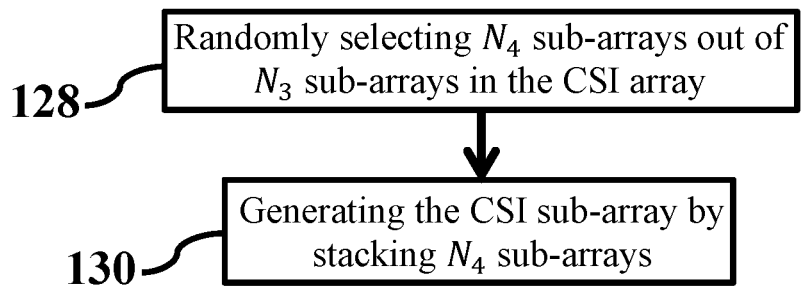
FIG. 1F shows a flowchart for extracting a CSI sub-array from a CSI array, consistent with one or more exemplary embodiments of the present disclosure.

For further detail with regard to step 124, FIG. 1F shows a flowchart for extracting a CSI sub-array from the CSI array, consistent with one or more exemplary embodiments of the present disclosure. In an exemplary embodiment, extracting the CSI sub-array may include randomly selecting $N_4$ sub-arrays from the CSI array (step 128) and generating the CSI sub-array from $N_4$ sub-arrays (step 130). In an exemplary embodiment, the CSI array may include CSI samples of a wireless channel between transmitter 204A and receiver 204B in time interval 306. In an exemplary embodiment, the wireless channel may be estimated $N_3$ times in each of the plurality of sub-carriers by sending packets from transmitter 204A to receiver 204B in a constant time difference. However, in an exemplary embodiment, transmitter 204A may not transmit consecutive packets with a constant time difference due to a quality of the wireless channel or limited communication resources. As a result, in an exemplary embodiment, consecutive packets may be sent in variable time differences. In addition, in an exemplary embodiment, the mapping model may be biased to a constant time difference of transmitting consecutive packets. In an exemplary embodiment, implementing step 124 may prevent the mapping model to be biased to a constant time difference between consecutive packets by selecting CSI samples from packets with random time differences.

Referring to FIGS. 1F and 3, in an exemplary embodiment, step 128 may include randomly selecting $N_4$ sub-arrays from the CSI array. In an exemplary embodiment, the CSI sub-array may be of size $N_1 \times N_2 \times N_4$ where $1 \le N_4 < N_3$. In an exemplary embodiment, the CSI array may include subset 312 of plurality of CSI samples 310. In an exemplary embodiment, the CSI sub-array may include a subset 314 of plurality of CSI samples 310. In an exemplary embodiment, each sub-array of size $N_1 \times N_2$ in the CSI array may include CSI samples obtained at a respective receive moment in time interval 306. In an exemplary embodiment, the CSI array may include $N_3$ sub-arrays where $N_3$ is a number of the plurality of receive moments. In an exemplary embodiment, each of $N_4$ sub-arrays may be of size $N_1 \times N_2$, that is, each of $N_4$ sub-arrays may include CSI samples obtained in a respective receive moment of the plurality of receive moments. In an exemplary embodiment, $N_4$ sub-arrays may be randomly selected out of $N_3$ sub-arrays of size $N_1 \times N_2$ in the CSI array. As a result, in an exemplary embodiment, $N_3$ sub-arrays may include CSI samples obtained at various receive moments with random time differences, enhancing a generalization of the mapping model.

In an exemplary embodiment, step 130 may include generating the CSI sub-array from $N_4$ sub-arrays. In an exemplary embodiment, generating the CSI sub-array may include stacking $N_4$ sub-arrays. In an exemplary embodiment, the CSI sub-array may be obtained by concatenating sub-arrays of the CSI array in a block matrix. Then, in an exemplary embodiment, the CSI sub-array may be obtained by multiplying the block matrix with a selection matrix. In an exemplary embodiment, each row of the selection matrix may be randomly selected from columns of an identity matrix. An exemplary identity matrix may be referred to as a square matrix with all elements of the principal diagonal equal to one and all other elements equal to zero. An exemplary identity matrix may be obtained from a memory coupled to processor 206.

Referring again to FIGS. 1C and 3, in an exemplary embodiment, step 120 may include extracting subset 312 from the plurality of raw CSI samples. In an exemplary embodiment, extracting subset 312 may include compensating a phase offset of each of the plurality of raw CSI samples. In an exemplary embodiment, phases of the plurality of raw CSI samples may be affected by several sources of error such as carrier frequency offset (CFO) and sampling frequency offset (SFO). As a result, in an exemplary embodiment, a performance of the mapping model may be impacted by erroneous phases of the plurality of raw CSI samples. In an exemplary embodiment, a linear transformation referred to as phase sanitization, may remove CFO and SFO from phases of the plurality of raw CSI samples. In an exemplary embodiment, phase sanitization may include obtaining $\alpha_0$ and $\alpha_1$ by the following:

$$\alpha_0 = \frac{1}{N_2} \sum_{f=1}^{N_2} \phi_f \qquad \text{Equation (1)}$$

$$\alpha_1 = \frac{\phi_{N_2} - \phi_1}{2\pi N_2} \qquad \text{Equation (2)}$$

where $\phi_f$ is a phase of a raw CSI sample in a sub-carrier f of the plurality of subcarriers and $1 \le f \le N_2$. Next, in an exemplary embodiment, a compensated phase of a CSI sample may be obtained according to an operation defined by:

$$\hat{\phi}_f = \phi_f - (\alpha_1 f + \alpha_0) \qquad \text{Equation (3)}$$

Figure 1G:
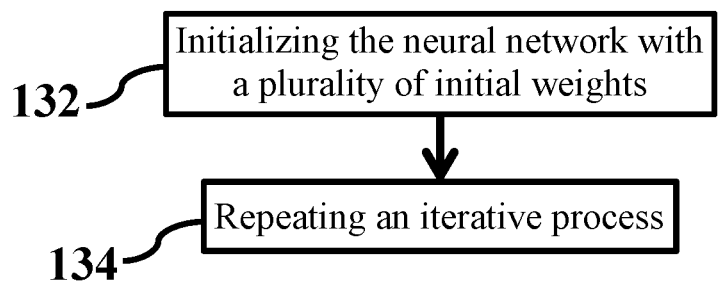
FIG. 1G shows a flowchart for obtaining a mapping model, consistent with one or more exemplary embodiments of the present disclosure.

Referring again to FIGS. 1A and 3, in an exemplary embodiment, step 106 may include obtaining the mapping model based on plurality of video frames 302 and the first plurality of CSI samples 310. In further detail regarding step 106, FIG. 1G shows a flowchart for obtaining a mapping model, consistent with one or more exemplary embodiments of the present disclosure.

Figure 4A:
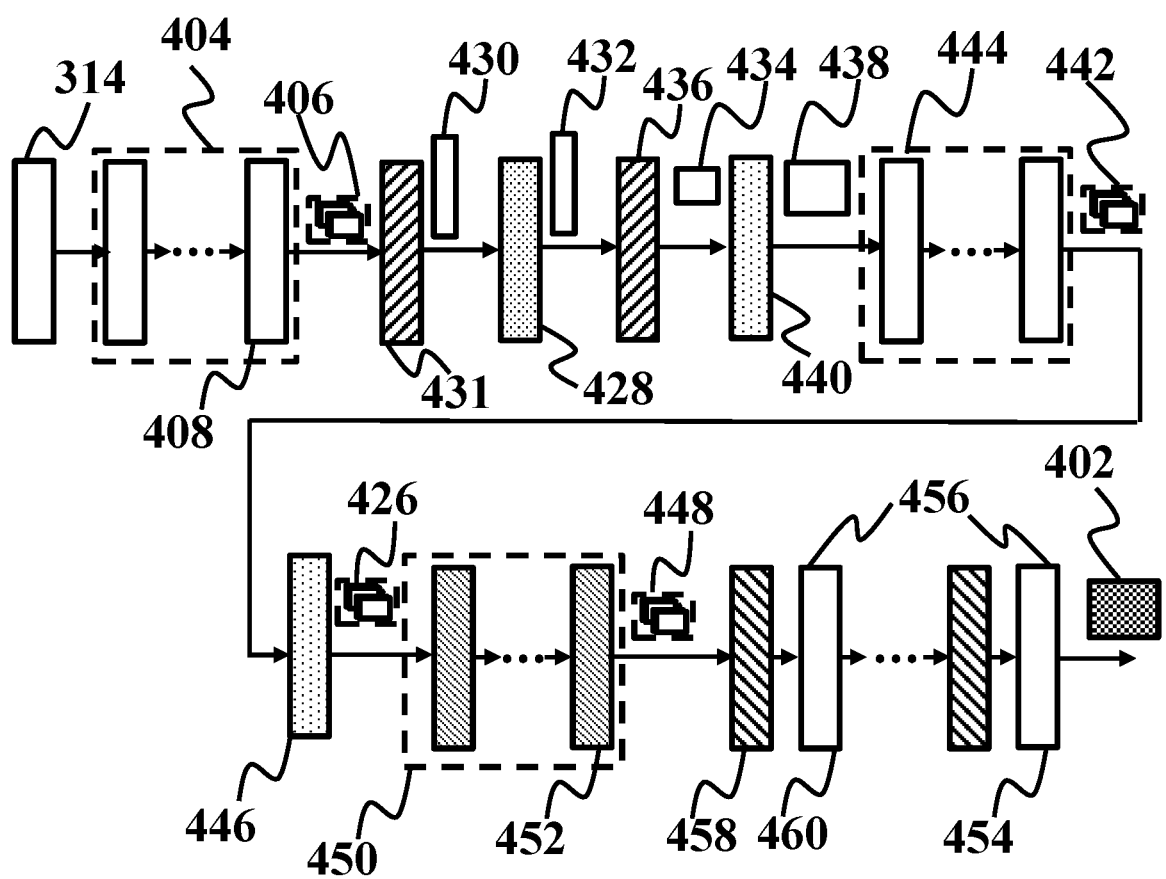
FIG. 4A shows a schematic of a neural network, consistent with one or more exemplary embodiments of the present disclosure.

FIG. 4A shows a schematic of a neural network, consistent with one or more exemplary embodiments of the present disclosure. In an exemplary embodiment, obtaining the mapping model in step 106 may include training a neural network 400. Referring to FIGS. 1G, 2 and 4A, an exemplary mapping model may be obtained utilizing processor 206. In an exemplary embodiment, training neural network 400 may include initializing neural network 400 (step 132) and repeating an iterative process (step 134).

For further detail with respect to step 132, in an exemplary embodiment, initializing neural network 400 may include generating the plurality of initial weights. In an exemplary embodiment, generating the plurality of initial weights may include generating a plurality of random variables from a probability distribution. In an exemplary embodiment, the probability distribution may be determined according to a required range of each of the plurality of initial weights. In an exemplary embodiment, the probability distribution may include a Gaussian distribution or a uniform distribution.

Figure 1H:
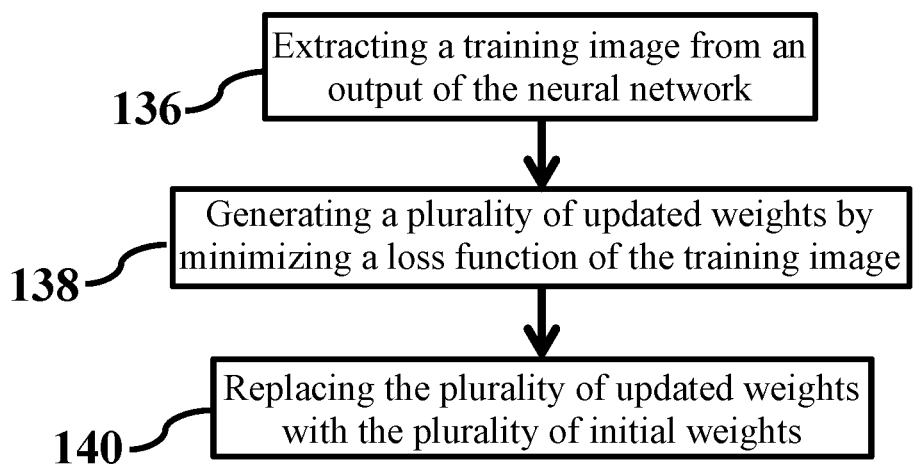
FIG. 1H shows a flowchart for repeating an iterative process, consistent with one or more exemplary embodiments of the present disclosure.

In further detail regarding step 134, FIG. 1H shows a flowchart for repeating an iterative process, consistent with one or more exemplary embodiments of the present disclosure. Referring to FIGS. 1H and 4A, an exemplary iterative process may include extracting a training image 402 from an output of neural network 400 (step 136), generating a plurality of updated weights (step 138), replacing the plurality of updated weights with the plurality of initial weights (step 140). In an exemplary embodiment, the iterative process may be repeated until a termination condition is satisfied. In an exemplary embodiment, neural network 400 may be trained to approximate training image 402 with a respective video frame of plurality of video frames 302. An exemplary termination condition may include a threshold for an error of approximation of training image 402 with video frame 304. An exemplary approximation error may be equal to a mean squared error.

Figure 1I:
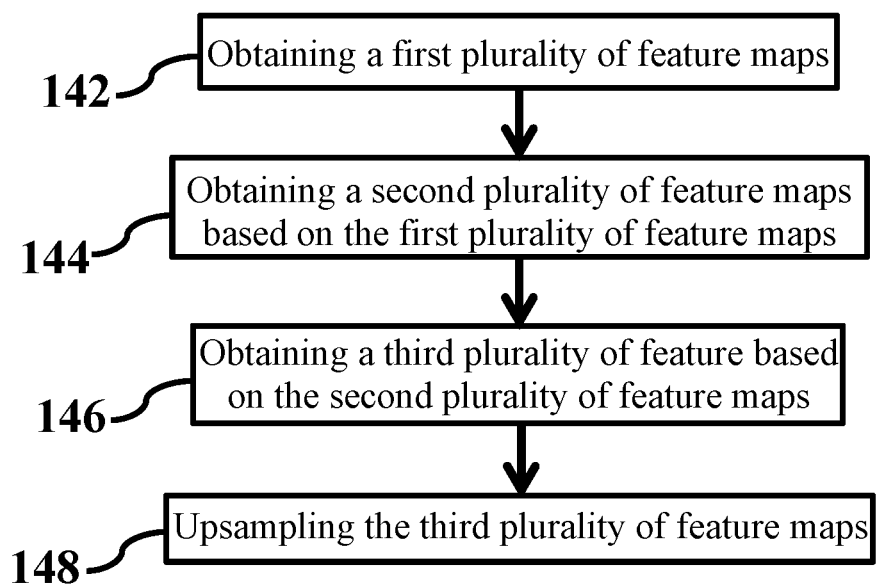
FIG. 1I shows a flowchart for applying a neural network on a subset of a plurality of CSI samples, consistent with one or more exemplary embodiments of the present disclosure.

For further detail with regard to step 136, FIG. 1I shows a flowchart for applying a neural network on a subset of a plurality of CSI samples, consistent with one or more exemplary embodiments of the present disclosure. Referring to FIGS. 1I, 3, and 4, in an exemplary embodiment, extracting training image 402 may include applying neural network 400 on subset 312 of first plurality of CSI samples 310. In an exemplary embodiment, applying neural network 400 on subset 312 may include obtaining a first plurality of feature maps (step 142), obtaining a second plurality of feature maps based on the first plurality of feature maps (step 144), obtaining a third plurality of feature maps based on the second plurality of feature maps (step 146), and upsampling the third plurality of feature maps (step 148). An exemplary feature map may be referred to as a 2D matrix of real valued data. An exemplary convolutional layer may receive a block of input feature maps and may generate a block of output feature map by applying convolution operations on the block of input feature maps.

In an exemplary embodiment, step 142 may include obtaining a first plurality of feature maps. Referring to FIGS. 3 and 4, in an exemplary embodiment, neural network 400 may include a first plurality of convolutional layers 404. In an exemplary embodiment, obtaining a first plurality of feature maps 406 may include applying first plurality of convolutional layers 404 on subset 314 of first plurality of CSI samples 310 as described below. In an exemplary embodiment, applying first plurality of convolutional layers 404 may include extracting first plurality of feature maps 406 from an output of a $(1, L_1)^{th}$ convolutional layer 408 of first plurality of convolutional layers 404 where $L_1$ is a number of first plurality of convolutional layers 404. An exemplary convolutional layer may be referred to as a number of filters followed by a number of non-linear activation functions. Exemplary filters may apply convolution operations on input feature maps of the convolutional layer. An exemplary convolutional layer, as described below in detail, may further include a normalization process.

Figure 4B:
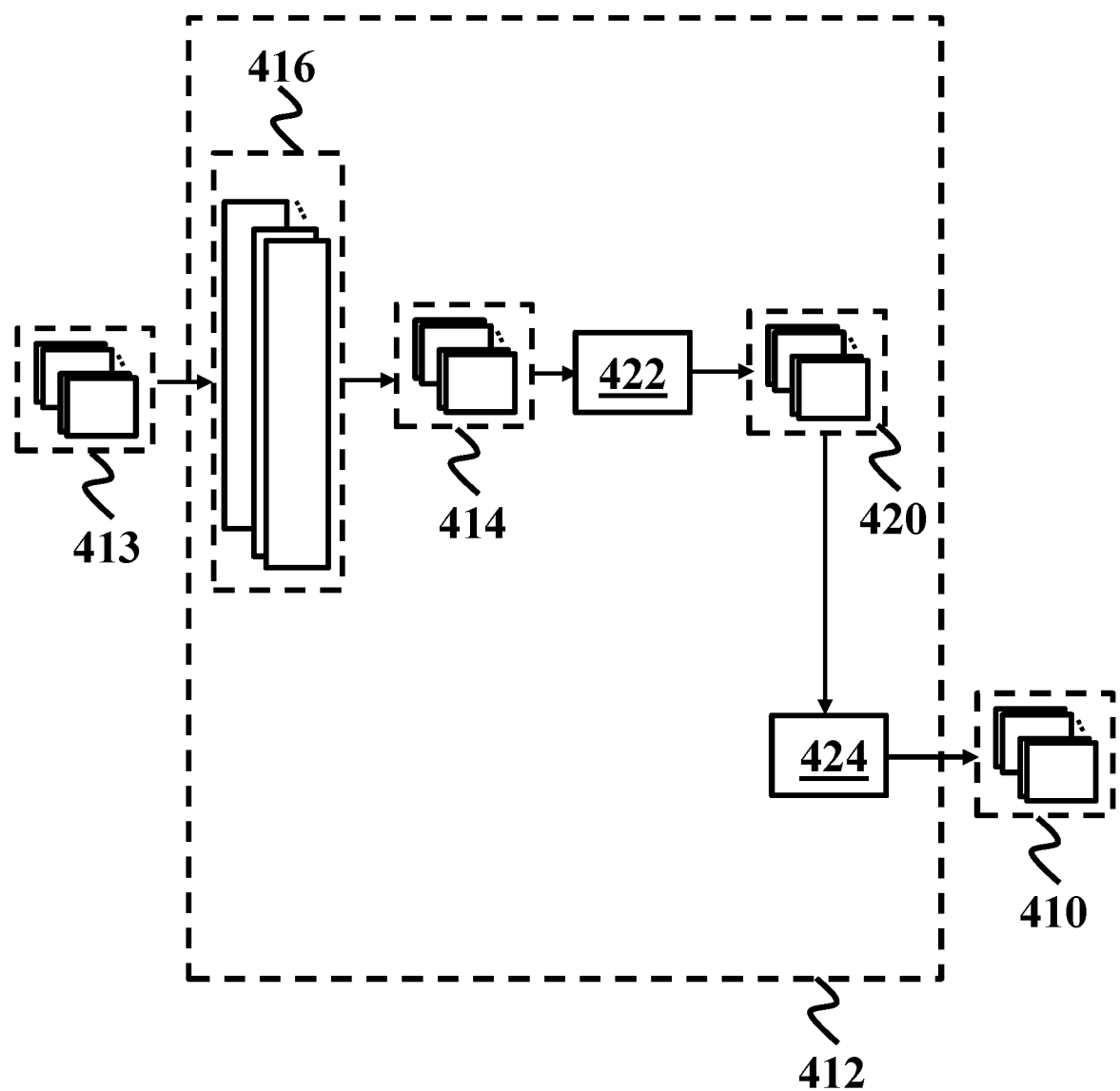
FIG. 4B shows a schematic of a convolutional layer, consistent with one or more exemplary embodiments of the present disclosure.

In further detail with respect to step 142, FIG. 4B shows a schematic of a convolutional layer, consistent with one or more exemplary embodiments of the present disclosure. Referring to FIGS. 2A and 4B, in an exemplary embodiment, extracting first plurality of feature maps 406 may include obtaining a $(1, l_1+1)^{th}$ plurality of feature maps 410 where $1 \le l_1 \le L_1$. In an exemplary embodiment, first plurality of convolutional layers 404 may include a $(1, l_1)^{th}$ convolutional layer 412. In an exemplary embodiment, obtaining $(1, l_1+1)^{th}$ plurality of feature maps 410 may include applying $(1, l_1)^{th}$ convolutional layer 412 on a plurality of feature maps 413.

Figure 1J:
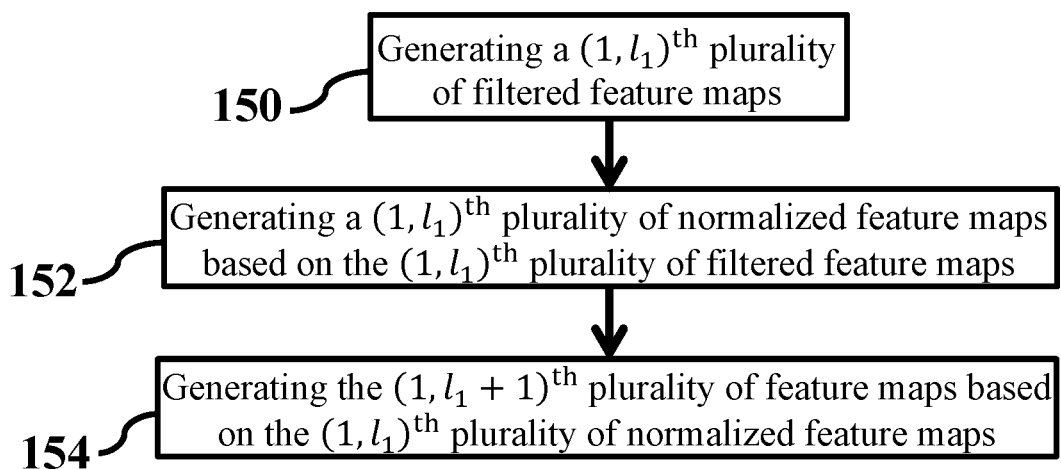
FIG. 1J shows a flowchart for obtaining a plurality of feature maps, consistent with one or more exemplary embodiments of the present disclosure.

For further detail with regard to step 142, FIG. 1J shows a flowchart for obtaining a plurality of feature maps, consistent with one or more exemplary embodiments of the present disclosure. In an exemplary embodiment, obtaining $(1, l_1+1)^{th}$ plurality of feature maps 410 may include generating a $(1, l_1)^{th}$ plurality of filtered feature maps (step 150), generating a $(1, l_1)^{th}$ plurality of normalized feature maps from the $(1, l_1)^{th}$ plurality of filtered feature maps (step 152), and generating $(1, l_1+1)^{th}$ plurality of feature maps 410 from the $(1, l_1)^{th}$ plurality of normalized feature maps (step 154).

Referring to FIGS. 1J, 4A, and 4B, in an exemplary embodiment, step 150 may include generating a $(1, l_1)^{th}$ plurality of filtered feature maps 414. In an exemplary embodiment, $(1, l_1)^{th}$ convolutional layer 412 may include a plurality of filters 416. In an exemplary embodiment, generating $(1, l_1)^{th}$ plurality of filtered feature maps 414 may include applying plurality of filters 416 on $(1, l_1)^{th}$ plurality of feature maps 413. In an exemplary embodiment, each of plurality of filters 416 may perform a convolution operation on a respective feature map of $(1, l_1)^{th}$ plurality of feature maps 413. In an exemplary embodiment, a $(1, 1)^{st}$ plurality of feature maps may include subset 314 of first plurality of CSI samples 310.

In an exemplary embodiment, step 152 may include generating a $(1, l_1)^{th}$ plurality of normalized feature maps 420. In an exemplary embodiment, $(1, l_1)^{th}$ convolutional layer 412 may include an instance normalization process 422. In an exemplary embodiment, generating $(1, l_1)^{th}$ plurality of normalized feature maps 420 may include applying instance normalization process 422 on $(1, l_1)^{th}$ plurality of filtered feature maps 414. In an exemplary embodiment, each of $(1, l_1)^{th}$ plurality of normalized feature maps 420 may be generated by applying instance normalization process 422 on a respective filtered feature map of $(1, l_1)^{th}$ plurality of filtered feature maps 414. In an exemplary embodiment, instance normalization process 422 may normalize $(1, l_1)^{th}$ plurality of filtered feature maps 414 by an average and a standard deviation of $(1, l_1)^{th}$ plurality of filtered feature maps 414. In an exemplary embodiment, instance normalization process 422 may calculate the average and the standard deviation of $(1, l_1)^{th}$ plurality of filtered feature maps 414 and all elements of $(1, l_1)^{th}$ plurality of filtered feature maps 414 may be normalized in accordance to the average and the standard deviation. Therefore, in an exemplary embodiment, elements of $(1, l_1)^{th}$ plurality of filtered feature maps 414 may follow a normal distribution, which may considerably reduce a required time for training neural network 400.

In an exemplary embodiment, step 154 may include generating $(1, 1_1+1)^{th}$ plurality of feature maps 410. In an exemplary embodiment, $(1, 1_1)^{th}$ convolutional layer 412 may include a $(1, 1_1)^{th}$ non-linear activation function 424. In an exemplary embodiment, generating $(1, 1_1+1)^{th}$ plurality of feature maps 410 may include implementing $(1, 1_1)^{th}$ non-linear activation function 424 on each of $(1, 1_1)^{th}$ plurality of normalized feature maps 420. In an exemplary embodiment, implementing $(1, 1_1)^{th}$ non-linear activation function 424 may include implementing one of a rectified linear unit (ReLU) function or an exponential linear unit (ELU) function. In an exemplary embodiment, implementing $(1, 1_1)^{th}$ non-linear activation function 424 may include implementing other types of non-linear activation functions such as leaky ReLU, scaled ELU, parametric ReLU, etc.

Figure 1K:
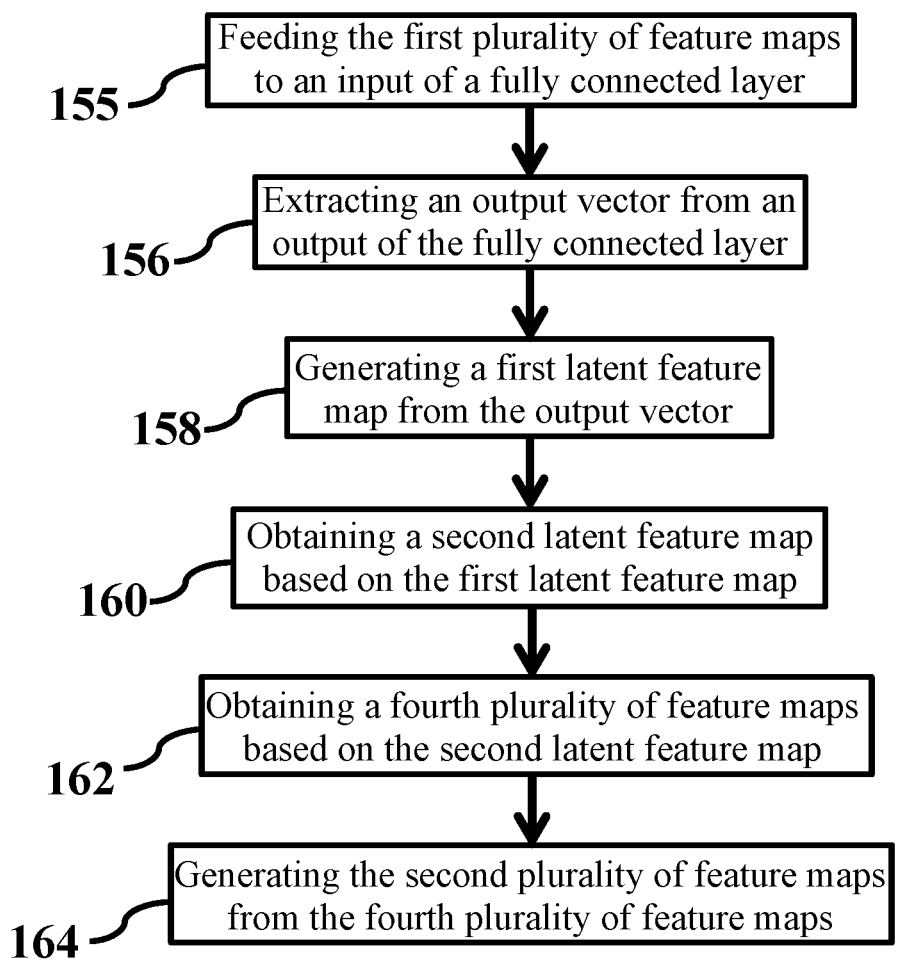
FIG. 1K shows a flowchart for obtaining a second plurality of feature maps, consistent with one or more exemplary embodiments of the present disclosure.

Referring again to FIGS. 1I and 4A, in an exemplary embodiment, step 144 may include obtaining a second plurality of feature maps 426. FIG. 1K shows a flowchart for obtaining a second plurality of feature maps, consistent with one or more exemplary embodiments of the present disclosure. In an exemplary embodiment, obtaining second plurality of feature maps 426 in step 144 may include feeding first plurality of feature maps 406 to an input of a fully connected layer of neural network 400 (step 155), extracting an output vector from an output of the fully connected layer (step 156), generating a first latent feature map from the output vector (step 158), obtaining a second latent feature map based on the first latent feature map (step 160), obtaining a fourth plurality of feature maps based on the second latent feature map (step 162), and generating the second plurality of feature maps from the fourth plurality of feature maps (step 164). In an exemplary embodiment, neural network 400 may include a fully connected layer 428. An exemplary fully connected layer may be referred to a set of input neurons and a set of output neurons, and each input neuron is connected to every output neuron.

In an exemplary embodiment, step 155 may include feeding first plurality of feature maps 406 to an input of fully connected layer 428. In an exemplary embodiment, first plurality of feature maps 406 may include a 2D array. In an exemplary embodiment, feeding first plurality of feature maps 406 may include obtaining an input vector 430 by implementing a flattening process 431 on first plurality of feature maps 406 in the 2D array. An exemplary flattening process may be referred to as generating a vector from an array by stacking columns of the array. In an exemplary embodiment, feeding first plurality of feature maps 406 may further include feeding the input vector to fully connected layer 428.

In an exemplary embodiment, step 156 may include extracting an output vector 432 from an output of fully connected layer 428. In an exemplary embodiment, fully connected layer 428 may include a non-linear activation function. An exemplary non-linear activation function may include a leaky ReLU activation function.

In an exemplary embodiment, step 158 may include generating a first latent feature map 434 from output vector 432. In an exemplary embodiment, generating first latent feature map 434 may include implementing a deflattening process 436 on output vector 432. An exemplary deflattening process may be referred to as generating a matrix from a vector. In an exemplary embodiment, generating first latent feature map 434 may include generating a matrix from a plurality of elements in output vector 432. In an exemplary embodiment, an aspect ratio of first latent feature map 434 may be equal to an aspect ratio of training image 402.

In an exemplary embodiment, step 160 may include a second latent feature map 438. In an exemplary embodiment, obtaining second latent feature map 438 may include applying a padding process 440 on first latent feature map 434. In an exemplary embodiment, padding process 440 may include adding columns and rows to edges of first latent feature map 434. In an exemplary embodiment, padding process 440 may extend an area of first latent feature map 434 that are processed by filters of a convolutional layer. An exemplary padding process may include one of a zero padding process or a reflection padding process.

In an exemplary embodiment, step 162 may include obtaining a fourth plurality of feature maps 442. In an exemplary embodiment, obtaining fourth plurality of feature maps 442 may include applying a second plurality of convolutional layers 444 of neural network 400 on second latent feature map 438. In an exemplary embodiment, applying second plurality of convolutional layers 444 on second latent feature map 438 may be similar to applying first plurality of convolutional layers 404 on subset 314 of first plurality of CSI samples 310 in step 142.

In an exemplary embodiment, step 164 may include generating second plurality of feature maps 426. In an exemplary embodiment, generating second plurality of feature maps 426 may include applying a padding process 446 on each of fourth plurality of feature maps 442. In an exemplary embodiment, applying padding process 446 on each of fourth plurality of feature maps 442 may be similar to applying padding process 440 on first latent feature map 434 in step 160.

Referring again to FIGS. 1I and 4A, in an exemplary embodiment, step 146 may include obtaining a third plurality of feature maps 448. In an exemplary embodiment, neural network 400 may include a residual neural network (ResNet). In an exemplary embodiment, obtaining third plurality of feature maps 448 may include applying the ResNet on second plurality of feature maps 426. In an exemplary embodiment, applying the ResNet may include applying a plurality of ResNet blocks 450 on second plurality of feature maps 426. In an exemplary embodiment, applying plurality of ResNet blocks 450 may include extracting third plurality of feature maps 448 from an output of an $L_r^{th}$ ResNet block 452 of plurality of ResNet blocks 450 where $L_r$ is a number of plurality of ResNet blocks 450. In an exemplary embodiment, extracting third plurality of feature maps 448 may include obtaining an $(l_r+1)^{th}$ plurality of residual feature maps. In an exemplary embodiment, extracting third plurality of feature maps 448 may include applying an $l_r^{th}$ ResNet block of plurality of ResNet blocks 450 on an $l_r^{th}$ plurality of residual feature maps where $1 \le l_r \le L_r$. In an exemplary embodiment, a first plurality of residual feature maps may include second plurality of feature maps 426. In an exemplary embodiment, each of plurality of ResNet blocks 450 may include two cascaded convolutional layers and a residual connection. In an exemplary embodiment, plurality of ResNet blocks 450 may be added to neural network 400 to avoid a vanishing gradient problem or to mitigate an accuracy saturation problem.

Figure 1L:
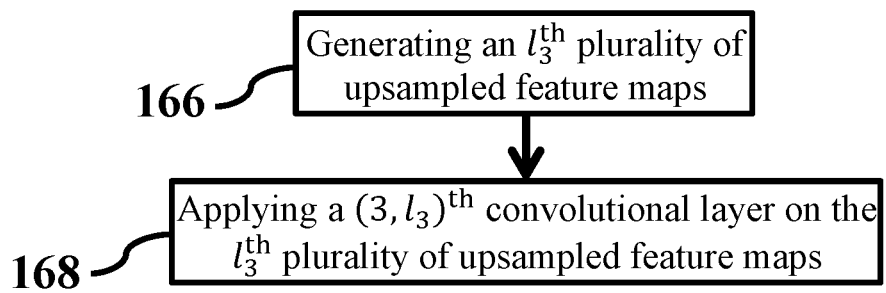
FIG. 1L shows a flowchart for upsampling a plurality of feature maps, consistent with one or more exemplary embodiments of the present disclosure.

For further detail with respect to step 148, FIG. 1L shows a flowchart for obtaining a second plurality of feature maps, consistent with one or more exemplary embodiments of the present disclosure. Referring to FIGS. 1L and 4A, in an exemplary embodiment, step 148 may include upsampling third plurality of feature maps 448. An exemplary upsampling process may include an upsampling layer followed by a convolutional layer. An exemplary upsampling layer may repeat rows and columns of an input feature map. In an exemplary embodiment, upsampling third plurality of feature maps 448 may include extracting training image 402 from an output of a $(3, L_3)^{th}$ convolutional layer 454 of a third plurality of convolutional layers 456 of neural network 400 where $L_3$ is a number of third plurality of convolutional layers 456. In an exemplary embodiment, extracting training image 402 may include obtaining a $(3, l_3+1)^{th}$ plurality of feature maps where $1 \le l_3 \le L_3$. In an exemplary embodiment, obtaining the $(3, l_3+1)^{th}$ plurality of feature maps may include generating an $l_3^{th}$ plurality of upsampled feature maps (step 166), and applying a $(3, l_3)^{th}$ convolutional layer of third plurality of convolutional layers 456 on the $l_3^{th}$ plurality of upsampled feature maps (step 168).

In an exemplary embodiment, step 166 may include generating an $l_3^{th}$ plurality of upsampled feature maps. In an exemplary embodiment, generating the $l_3^{th}$ plurality of upsampled feature maps may include implementing an upsampling process 458 on a $(3, l_3)^{th}$ plurality of feature maps. In an exemplary embodiment, a $(3, 1)^{st}$ plurality of feature maps may include third plurality of feature maps 448. In an exemplary embodiment, implementing upsampling process 458 may include adding rows and/or columns to each of the $(3, l_3)^{th}$ plurality of feature maps. As a result, in an exemplary embodiment, a size of $l_3^{th}$ plurality of upsampled feature maps may be larger than a size of the $(3, l_3)^{th}$ plurality of feature maps. In an exemplary embodiment, upsampling process 458 may include upsampling each of the $(3, l_3)^{th}$ plurality of feature maps by a factor of two.

In an exemplary embodiment, step 168 may include applying a $(3, l_3)^{th}$ convolutional layer 460 of third plurality of convolutional layers 456 on the $l_3^{th}$ plurality of upsampled feature maps. In an exemplary embodiment, applying a $(3, l_3)^{th}$ convolutional layer 460 on the $l_3^{th}$ plurality of upsampled feature maps may be similar to applying $(1, l_1)^{th}$ convolutional layer 412 on a $(1, l_1)^{th}$ plurality of feature maps 413 in step 142.

Figure 1M:
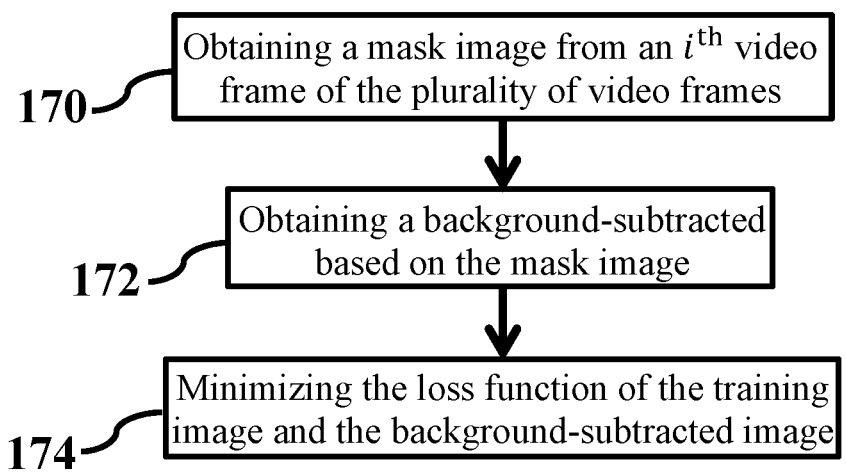
FIG. 1M shows a flowchart for generating a plurality of updated weights, consistent with one or more exemplary embodiments of the present disclosure.

Referring again to FIG. 1H, in an exemplary embodiment, step 138 may include generating a plurality of updated weights. FIG. 1M shows a flowchart for generating a plurality of updated weights, consistent with one or more exemplary embodiments of the present disclosure. Referring to FIGS. 1M-4A, in an exemplary embodiment, generating the plurality of updated weights in step 138 may include minimizing a loss function of training image 402 and video frame 304. An exemplary loss function may include a mean squared error of training image 402 and video frame 304. In an exemplary embodiment, minimizing the loss function may include obtaining a mask image (step 170), obtaining a background-subtracted image based on the mask image (step 172), and minimizing the loss function of the training image and the background-subtracted image (step 174). In an exemplary embodiment, video frame 304 may include background objects and dynamic objects. In an exemplary embodiment, background objects may be fixed in each of plurality of video frames 302. In contrast, in an exemplary embodiment, dynamic objects may move as video device 202 captures video data associated with plurality of video frames 302. In an exemplary embodiment, neural network 400 may be trained to identify dynamic objects in video frame 304. Therefore, in an exemplary embodiment, neural network 400 may be trained to detect dynamic objects by removing background objects from video frame 304.

In an exemplary embodiment, step 170 may include obtaining a mask image. An exemplary mask image may include non-zero values in position of dynamic objects and zero values in position of background objects. In an exemplary embodiment, obtaining the mask image may include extracting a plurality of masks from video frame 304. In an exemplary embodiment, each of the plurality of masks may be obtained from a respective dynamic object of a plurality of dynamic objects in video frame 304. Each pixel of an exemplary mask image may include a binary value. In an exemplary embodiment, each pixel in the plurality of masks may be equal to one. In an exemplary embodiment, each pixel of mask image that is not in the plurality of masks may be equal to zero.

In an exemplary embodiment, step 172 may include obtaining the background-subtracted image. In an exemplary embodiment, obtaining the background-subtracted image may include multiplying the mask image by video frame 304. In an exemplary embodiment, data in pixels of background objects in video frame 304 may be removed in the background-subtracted image.

In an exemplary embodiment, step 174 may include minimizing the loss function of the training image and the background-subtracted image. In an exemplary embodiment, minimizing the loss function may be performed by a gradient descent method. In an exemplary embodiment, the gradient descent method may include generating a plurality of adjustment values. Each of the plurality of adjustment values may be proportional to a gradient of the loss function with respect to each of the plurality of initial weights. In an exemplary embodiment, the plurality of adjustment values may be obtained by a back propagation algorithm. In an exemplary embodiment, the plurality of updated weights may be obtained by adding each of the plurality of adjustment values to a respective initial weight of the plurality of initial weights.

Referring again to FIG. 1H, in an exemplary embodiment, step 140 may include replacing the plurality of updated weights with the plurality of initial weights. In an exemplary embodiment, a value of the loss function may be minimized by the plurality of updated weights. In an exemplary embodiment, in following iterations of the iterative process, the loss function may be minimized by calculating a gradient of the loss function with respect to the plurality of updated weights instead of the plurality of initial weights.

Referring again to FIGS. 1A, and 2-4, in an exemplary embodiment, step 108 may include obtaining a third plurality of samples in the second frequency band. In an exemplary embodiment, obtaining the third plurality of samples may include obtaining a second plurality of CSI samples. In an exemplary embodiment, the second plurality of CSI samples may be obtained utilizing communication system 204. In an exemplary embodiment, obtaining the second plurality of CSI samples may be similar to obtaining subset 312 of first plurality of CSI samples 310 in step 104.

In an exemplary embodiment, step 110 may include obtaining the data sample based on the mapping model and the third plurality of samples. In an exemplary embodiment, obtaining the data sample may include obtaining image 208 based on the mapping model and the second plurality of CSI samples. In an exemplary embodiment, image 208 may be obtained utilizing processor 206. In an exemplary embodiment, obtaining image 208 may include applying the mapping model on the second plurality of CSI samples. In an exemplary embodiment, applying the mapping model on the second plurality of CSI samples may include applying neural network 400 on the second plurality of CSI samples. In an exemplary embodiment, applying neural network 400 on the second plurality of CSI samples may be similar to applying neural network 400 on subset 312 of first plurality of CSI samples 310 in step 136.

Figure 5:
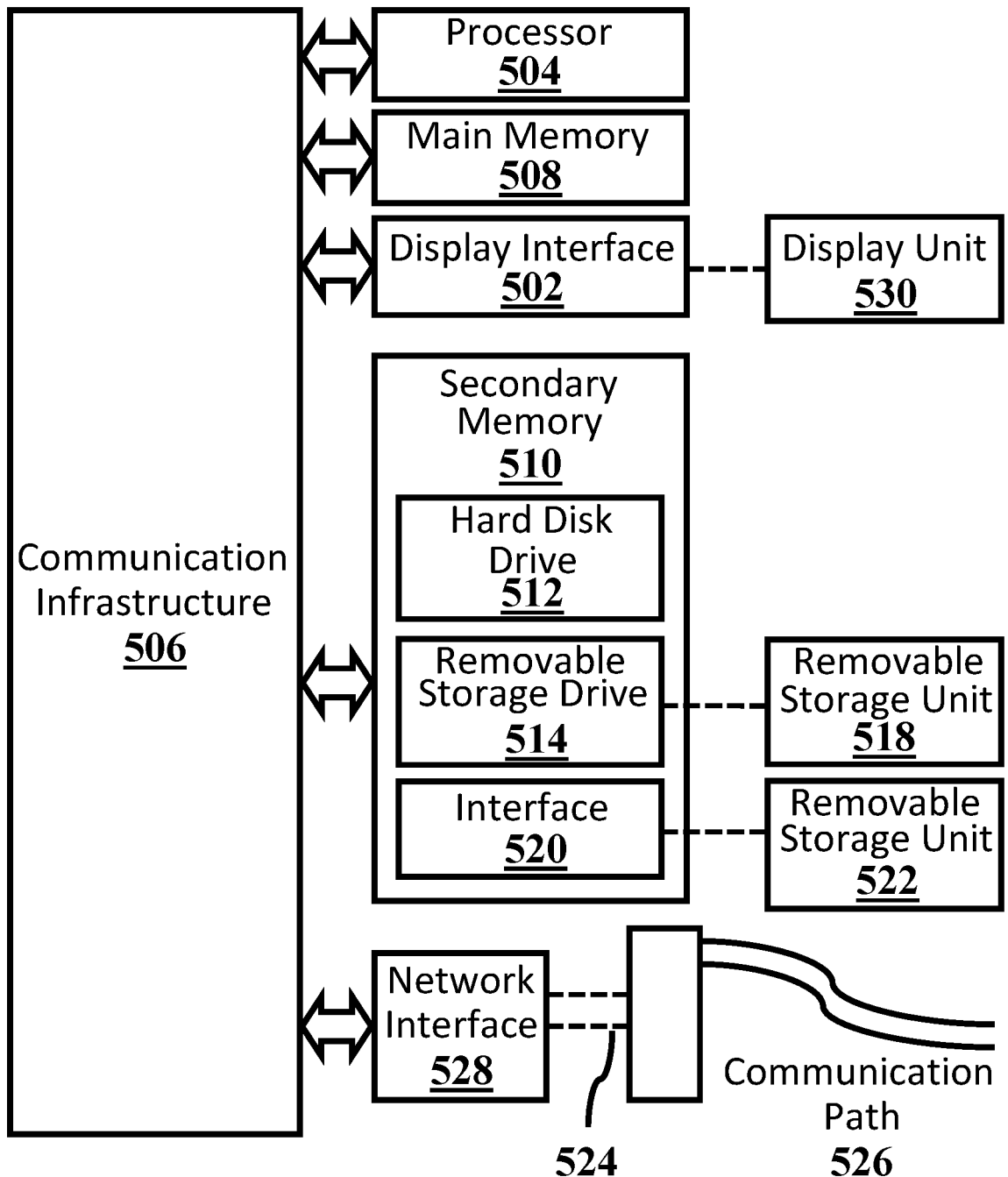
FIG. 5 shows a high-level functional block diagram of a computer system, consistent with one or more exemplary embodiments of the present disclosure.

FIG. 5 shows an example computer system 500 in which an embodiment of the present invention, or portions thereof, may be implemented as computer-readable code, consistent with exemplary embodiments of the present disclosure. For example, different steps of method 100 may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-4B.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 504 may be a special purpose (e.g., a graphical processing unit) or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 may be connected to a communication infrastructure 506, for example, a bus, message queue, network, or multi-core message-passing scheme.

In an exemplary embodiment, computer system 500 may include a display interface 502, for example a video connector, to transfer data to a display unit 530, for example, a monitor. Computer system 500 may also include a main memory 508, for example, random access memory (RAM), and may also include a secondary memory 510. Secondary memory 510 may include, for example, a hard disk drive 512, and a removable storage drive 514. Removable storage drive 514 may include a floppy disk drive, a magnetic tape drive, an optical disk drive, a flash memory, or the like. Removable storage drive 514 may read from and/or write to a removable storage unit 518 in a well-known manner. Removable storage unit 518 may include a floppy disk, a magnetic tape, an optical disk, etc., which may be read by and written to by removable storage drive 514. As will be appreciated by persons skilled in the relevant art, removable storage unit 518 may include a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement different embodiments of the present disclosure as discussed herein. In particular, the computer programs, when executed, enable processor device 504 to implement the processes of the present disclosure, such as the operations in method 100 illustrated by flowchart 100 of FIG. 1A and flowchart 104 of FIG. 1B discussed above. Accordingly, such computer programs represent controllers of computer system 500. Where an exemplary embodiment of method 100 is implemented using software, the software may be stored in a computer program product and loaded into computer system 500 using removable storage drive 514, interface 520, and hard disk drive 512, or communications interface 524.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

EXAMPLE

In this example, a performance of a method (similar to method 100) for generating images from CSI samples is demonstrated. Different steps of the method are implemented utilizing a system (similar to system 200). The system includes a Wi-Fi system (similar to communication system 204). Each access point (similar to transmitter 204A and receive 204B) of the Wi-Fi system includes 3 antennas, that is, $M_t=M_r=3$. A bandwidth of the Wi-Fi System is about 20 MHz, divided into 56 sub-carriers, that is, $N_2=56$. A subset of a plurality of CSI samples (similar to subset 312 of plurality of CSI samples 310) includes 29 CSI sub-arrays, that is, $N_3=29$. A subset of CSI samples (similar to subset 314) is obtained by randomly selecting 17 CSI sub-arrays out of 29 CSI sub-arrays, that is, $N_4=17$.

A camera (similar to video device 202) captures video data and converts the video data into video frames (similar to plurality of video frames 308) at 30 frames per second (fps) with 640×480 resolution. Dimensions of video frames are reduced by a factor of two. Video frames are downsampled by five, resulting in 6 fps, that is, a time interval (similar to time interval 306) between two consecutive frames is about 166.7 msec.

A neural network (similar to neural network 400) is trained for generating images from CSI samples. A number of a first plurality of convolutional layers (similar to first plurality of convolutional layers 404) is equal to six, that is, $L_1=6$. A number of plurality of filters are 18, 64, 128, 256, 512, and 512. A size of each of first plurality of feature maps (similar to first plurality of feature maps 406) is 5×1. As a result, a size an input vector (similar to input vector 430) is equal to 512×5=2560. A size of an output vector (similar to output vector 432) is equal to 972, from which a first latent feature map (similar to first latent feature map 434) of size 36×27 is generated. A second latent feature map (similar to second latent feature map 438) of size 38×29 is generated by a padding process (similar to padding process 440). A number of a second plurality of convolutional layers (similar to second plurality of convolutional layers 444) may be equal to three, that is, $L_2=3$, with 32, 64, and 128 filters. A size of each of fourth plurality of feature maps (similar to fourth plurality of feature maps 442) is equal to 8×6. A size of each of plurality of second feature maps (similar to plurality of second feature maps 426) is equal to 10×8. A number of a plurality ResNet blocks (similar to plurality ResNet blocks 450) is equal to three, each with 128 filters. A size of each of a third plurality of feature maps (similar to third plurality of feature maps 448) is equal to 8×6. A number of a third plurality of convolutional layers (similar to third plurality of convolutional layers 456) is equal to seven, that is, $L_3=7$, with 128, 64, 32, 16, 8, 4, and 2 filters. An output of the third plurality of convolutional layers may be cropped to a size of 320×240.

Performance of the system is evaluated by defining two metrics. A subject is approximated in generated frames (each similar to image 208) and in target frames (similar to plurality of video frames 302) by their bounding box (BB), denoted by $BB_g$ and $BB_t$, respectively. A first metric is referred to as subject overlap (SO), defined by the following:

$$SO = \frac{A(\text{overlap}(BB_g, BB_t))}{\min\{A(BB_g), A(BB_t)\}} \quad \text{Equation (4)}$$

where A(BB) returns a number of pixels in BB. A second metric referred to as subject size (SS), defined by the following:

$$SS = \min\{\frac{A(BB_g)}{A(BB_t)}, \frac{A(BB_t)}{A(BB_g)}\} \quad \text{Equation (5)}$$

Both metrics are always in a range of [0, 1] and are equal to one for a complete match. SO and SS quantify displacement and size mismatch of a subject in the generated frame, which capture position error of the subject in width and height. The mapping model is tested in five-fold cross-validation (CV) settings. Average and standard deviation values of SO and SS obtained from each fold of CV for two use cases (UC) are in Table 1. In first use case (UC1), the neural network is trained with background-subtracted images and in second use case (UC2), the neural network is trained with video frames without background subtraction.

TABLE 1

Cross-validation metrics for UC1 and UC2

| CV fold | 1 | 2 | 3 | 4 | 5 |
|---|---|---|---|---|---|
| UC1 SO | 0.72 ± 0.21 | 0.62 ± 0.30 | 0.84 ± 0.18 | 0.83 ± 0.17 | 0.86 ± 0.15 |
| UC1 SS | 0.67 ± 0.16 | 0.77 ± 0.18 | 0.87 ± 0.13 | 0.82 ± 0.17 | 0.82 ± 0.17 |
| UC2 SO | 0.74 ± 0.33 | 0.77 ± 0.30 | 0.69 ± 0.33 | 0.76 ± 0.27 | 0.74 ± 0.32 |
| UC2 SS | 0.54 ± 0.11 | 0.66 ± 0.14 | 0.62 ± 0.16 | 0.70 ± 0.14 | 0.73 ± 0.15 |

For all the results in Table 1, all values of average metrics are higher than 0.5, indicating an acceptable performance of the neural network. In addition, SO and SS in UC2 are lower than UC1 because the same structure and training configuration are considered for both UCs, however, the neural network in UC2 intends to model the dynamic subject as well as the static background information while the neural network in UC1 models only dynamic objects.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying FIGURES and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for transferring data between different frequency bands by generating an image from channel state information (CSI) samples in a communication system, the method comprising:

capturing, utilizing one or more processors, video data associated with a plurality of video frames by capturing video data associated with an $i^{th}$ video frame of the plurality of video frames where $i \geq 1$;

obtaining, utilizing the communication system, a first plurality of CSI samples by obtaining an $i^{th}$ subset of the first plurality of CSI samples simultaneously with capturing video data associated with the $i^{th}$ video frame;

obtaining, utilizing the one or more processors, a mapping model by training a neural network, comprising:

initializing the neural network with a plurality of initial weights; and repeating an iterative process until a termination condition is satisfied, the iterative process comprising:

extracting a training image from an output of the neural network by applying the neural network on the $i^{th}$ subset of the first plurality of CSI samples, comprising:

obtaining a first plurality of feature maps by applying a first plurality of convolutional layers of the neural network on the $i^{th}$ subset of the first plurality of CSI samples;

obtaining a second plurality of feature maps by feeding the first plurality of feature maps to an input of a fully connected layer of the neural network;

obtaining a third plurality of feature maps by applying a residual neural network (ResNet) of the neural network on the second plurality of feature maps; and upsampling the third plurality of feature maps;

generating a plurality of updated weights by minimizing a loss function of the training image and the $i^{th}$ video frame; and replacing the plurality of updated weights with the plurality of initial weights;

obtaining, utilizing the communication system, a second plurality of CSI samples; and obtaining, utilizing the one or more processors, the image by applying the mapping model on the second plurality of CSI samples.

2. A method for transferring data between different frequency bands by generating a data sample in a first frequency band from measurements in a second frequency band, the method comprising:

obtaining, utilizing a first measuring system, a first plurality of samples by measuring a first frequency response of an environment in the first frequency band;

obtaining, utilizing a second measuring system, a second plurality of samples by measuring a second frequency response of the environment in the second frequency band;

obtaining, utilizing one or more processors, a mapping model based on the first plurality of samples and the second plurality of samples;

obtaining, utilizing the second measuring system, a third plurality of samples by measuring a third frequency response of the environment in the second frequency band; and obtaining, utilizing the one or more processors, the data sample by applying the mapping model on the third plurality of samples.

3. The method of claim 2, wherein:
measuring the first frequency response comprises capturing, utilizing a video device, a plurality of video frames by capturing video data associated with an $i^{th}$ video frame of the plurality of video frames in an $i^{th}$ time interval where $i≥1$;
measuring the second frequency response comprises obtaining, utilizing a communication system, a first plurality of channel state information (CSI) samples by obtaining an $i^{th}$ subset of the first plurality of CSI samples in the $i^{th}$ time interval;
measuring the third frequency response comprises obtaining a second plurality of CSI samples; and
obtaining the data sample comprises obtaining an image.

4. The method of claim 3, wherein obtaining the $i^{th}$ subset of the first plurality of CSI samples comprises:
transmitting a plurality of transmit signals by a transmitter of the communication system;
receiving a plurality of receive signals associated with the plurality of transmit signals by a receiver of the communication system; and
generating the $i^{th}$ subset of the first plurality of CSI samples by:
obtaining a plurality of raw CSI samples based on the plurality of receive signals; and
extracting the $i^{th}$ subset of the first plurality of CSI samples from the plurality of raw CSI samples by compensating a phase offset of each of the plurality of raw CSI samples.

5. The method of claim 4, wherein:
transmitting the plurality of transmit signals comprises transmitting each of the plurality of transmit signals in a respective sub-carrier of a plurality of sub-carriers and at a respective transmit moment of a plurality of transmit moments in the $i^{th}$ time interval by a respective transmit antenna of a plurality of transmit antennas associated with the transmitter;
receiving the plurality of receive signals comprises receiving each of the plurality of receive signals in a respective sub-carrier of the plurality of sub-carriers and at a respective receive moment of a plurality of receive moments in the $i^{th}$ time interval by a respective receive antenna of a plurality of receive antennas associated with the receiver; and
obtaining the plurality of raw CSI samples comprises obtaining a CSI array of size $N_1 \times N_2 \times N_3$ by:
generating each of a plurality of CSI vectors of size $$\frac{N_1}{2} \times 1$$

by estimating a respective multiple-input multiple output (MIMO) channel of a plurality of MIMO channels by processing a respective subset of the plurality of receive signals, each of the plurality of MIMO channels comprising a wireless channel between the transmitter and the receiver in a respective sub-carrier of the plurality of sub-carriers and at a respective receive moment of the plurality of receive moments; and
generating the CSI array by setting each element in the CSI array to one of a real part or an imaginary part of a respective element in a respective CSI vector of the plurality of CSI vectors, wherein:
$N_1 = 2 M_t M_r$,
$M_t$ is a number of the plurality of transmit antennas,
$M_r$ is a number of the plurality of receive antennas,
$N_2$ is a number of the plurality of sub-carriers, and
$N_3$ is a number of the plurality of receive moments.

6. The method of claim 5, wherein obtaining the plurality of raw CSI samples further comprises extracting a CSI sub-array of size $N_1 \times N_2 \times N_4$ from the CSI array where $1 ≤ N_4 < N_3$ by:
randomly selecting $N_4$ sub-arrays of size $N_1 \times N_2$ out of $N_3$ sub-arrays of size $N_1 \times N_2$ in the CSI array; and
generating the CSI sub-array by stacking $N_4$ sub-arrays.

7. The method of claim 3, wherein obtaining the mapping model comprises training a neural network by:
initializing the neural network with a plurality of initial weights; and
repeating an iterative process until a termination condition is satisfied, the iterative process comprising:
extracting a training image from an output of the neural network by applying the neural network on the $i^{th}$ subset of the first plurality of CSI samples;
generating a plurality of updated weights by minimizing a loss function of the training image and the $i^{th}$ video frame; and
replacing the plurality of updated weights with the plurality of initial weights.

8. The method of claim 7, wherein applying the neural network on the $i^{th}$ subset of the first plurality of CSI samples comprises:
obtaining a first plurality of feature maps by applying a first plurality of convolutional layers of the neural network on the $i^{th}$ subset of the first plurality of CSI samples;
obtaining a second plurality of feature maps by feeding the first plurality of feature maps to an input of a fully connected layer of the neural network;
obtaining a third plurality of feature maps by applying a residual neural network (ResNet) of the neural network on the second plurality of feature maps; and
upsampling the third plurality of feature maps.

9. The method of claim 8, wherein applying the first plurality of convolutional layers comprises extracting the first plurality of feature maps from an output of a $(1, L_1)^{th}$ convolutional layer of the first plurality of convolutional layers where $L_1$ is a number of the first plurality of convolutional layers, extracting the first plurality of feature maps comprising obtaining a $(1, l_1+1)^{th}$ plurality of feature maps where $1 ≤ l_1 ≤ L_1$ by:
generating a $(1, L_1)^{th}$ plurality of filtered feature maps by applying a $(1, l_1)^{th}$ plurality of filters on a $(1, l_1)^{th}$ plurality of feature maps, a $(1, 1)^{st}$ plurality of feature maps comprising the $i^{th}$ subset of the first plurality of CSI samples;
generating a $(1, l_1)^{th}$ plurality of normalized feature maps by applying an instance normalization process on the $(1, l_1)^{th}$ plurality of filtered feature maps; and
generating the $(1, l_1+1)^{th}$ plurality of feature maps by implementing a $(1, l_1)^{th}$ non-linear activation function on each of the $(1, l_1)^{th}$ plurality of normalized feature maps.

10. The method of claim 8, wherein obtaining the second plurality of feature maps further comprises:
extracting an output vector from an output of the fully connected layer;
generating a first latent feature map by generating a matrix from a plurality of elements in the output vector;

obtaining a second latent feature map by applying a padding process on the first latent feature map;

obtaining a fourth plurality of feature maps by applying a second plurality of convolutional layers of the neural network on the second latent feature map by extracting the fourth plurality of feature maps from an output of a $(2, L_2)^{th}$ convolutional layer of the second plurality of convolutional layers where $L_2$ is a number of the second plurality of convolutional layers, extracting the fourth plurality of feature maps comprising obtaining a $(2, l_2+1)^{th}$ plurality of feature maps where $1 \leq l_2 \leq L_2$ by:

generating a $(2, l_2)^{th}$ plurality of filtered feature maps by applying a $(2, l_2+1)^{th}$ plurality of filters on a $(2, l_2)^{th}$ plurality of feature maps, a $(2, 1)^{st}$ plurality of feature maps comprising the second latent feature map;

generating a $(2, l_2)^{th}$ plurality of normalized feature maps by applying the instance normalization process on the $(2, l_2)^{th}$ plurality of filtered feature maps; and generating the $(2, l_2+1)^{th}$ plurality of feature maps by implementing a $(2, l_2)^{th}$ non-linear activation function on each of the $(2, l_2)^{th}$ plurality of normalized feature maps; and generating the second plurality of feature maps by applying the padding process on each of the fourth plurality of feature maps.

11. The method of claim 8, wherein applying the ResNet comprises applying a plurality of ResNet blocks by extracting the third plurality of feature maps from an output of an $L_r^{th}$ ResNet block of the plurality of ResNet blocks where $L_r$ is a number of the plurality of ResNet blocks, extracting the third plurality of feature maps comprising obtaining an $(1_r+1)^{th}$ plurality of residual feature maps by applying an $1_r^{th}$ ResNet block of the plurality of ResNet blocks on an $1_r^{th}$ plurality of residual feature maps where $1 \leq l_r \leq L_r$, a first plurality of residual feature maps comprising the second plurality of feature maps and the $1_r^{th}$ ResNet block comprising two cascaded convolutional layers and a residual connection.

12. The method of claim 8, wherein upsampling the third plurality of feature maps comprises extracting the training image from an output of a $(3, L_3)^{th}$ convolutional layer of a third plurality of convolutional layers of the neural network where $L_3$ is a number of the third plurality of convolutional layers, extracting the training image comprising obtaining a $(3, l_3+1)^{th}$ plurality of feature maps where $1 \leq l_3 \leq L_3$ by:

generating an $l_3^{th}$ plurality of upsampled feature maps by implementing an upsampling process on a $(3, l_3)^{th}$ plurality of feature maps, a $(3, 1)^{st}$ plurality of feature maps comprising the third plurality of feature maps;

generating a $(3, l_3)^{th}$ plurality of filtered feature maps by applying a $(3, l_3)^{th}$ plurality of filters on the $l_3^{th}$ plurality of upsampled feature maps;

generating a $(3, l_3)^{th}$ plurality of normalized feature maps by applying the instance normalization process on the $(3, l_3)^{th}$ plurality of filtered feature maps; and generating the $(3, l_3+1)^{th}$ plurality of feature maps by implementing a $(3, l_3)^{th}$ non-linear activation function on each of the $(3, l_3)^{th}$ plurality of normalized feature maps.

13. The method of claim 7, wherein minimizing the loss function of the training image and the $i^{th}$ video frame comprises:

obtaining a mask image by extracting a plurality of masks from the $i^{th}$ video frame, each of the plurality of masks associated with a respective dynamic object of a plurality of dynamic objects in the $i^{th}$ video frame;

obtaining a background-subtracted image by multiplying the mask image by the $i^{th}$ video frame; and minimizing the loss function of the training image and the background-subtracted image.

14. A system for transferring data between different frequency bands by generating an image from channel state information (CSI) samples in a communication system, the system comprising:

a memory having processor-readable instructions stored therein; and one or more processors configured to access the memory and execute the processor-readable instructions, which, when executed by the one or more processors configures the one or more processors to perform a method, the method comprising:

capturing video data associated with a plurality of video frames by capturing an $i^{th}$ video frame of the plurality of video frames in an $i^{th}$ time interval where $i \geq 1$;

obtaining, utilizing the communication system, a first plurality of CSI samples by obtaining an $i^{th}$ subset of the first plurality of CSI samples in the $i^{th}$ time interval;

obtaining a mapping model based on the plurality of video frames and the first plurality of CSI samples;

obtaining, utilizing the communication system, a second plurality of CSI samples; and obtaining the image by applying the mapping model on the second plurality of CSI samples.

15. The system of claim 14, wherein obtaining the $i^{th}$ subset of the first plurality of CSI samples comprises:

transmitting a plurality of transmit signals by a transmitter of the communication system, comprising transmitting each of the plurality of transmit signals in a respective sub-carrier of a plurality of sub-carriers and at a respective transmit moment of a plurality of transmit moments in the $i^{th}$ time interval by a respective transmit antenna of a plurality of transmit antennas associated with the transmitter;

receiving a plurality of receive signals associated with the plurality of transmit signals by a receiver of the communication system, comprising receiving each of the plurality of receive signals in a respective sub-carrier of the plurality of sub-carriers and at a respective receive moment of a plurality of receive moments in the $i^{th}$ time interval by a respective receive antenna of a plurality of receive antennas associated with the receiver; and generating the $i^{th}$ subset of the first plurality of CSI samples by:

obtaining a plurality of raw CSI samples based on the plurality of receive signals; and extracting the $i^{th}$ subset of the first plurality of CSI samples from the plurality of raw CSI samples by compensating a phase offset of each of the plurality of raw CSI samples.

16. The system of claim 15, wherein obtaining the plurality of raw CSI samples comprises:

obtaining a CSI array of size $N_1 \times N_2 \times N_3$ by:

generating each of a plurality of CSI vectors of size $$\frac{N_1}{2} \times 1$$

by estimating a respective multiple-input multiple output (MIMO) channel of a plurality of MIMO channels by processing a respective subset of the plurality of receive signals, each of the plurality of MIMO channels comprising a wireless channel between the transmitter and the receiver in a respective sub-carrier of the plurality of sub-carriers and at a respective receive moment of the plurality of receive moments; and generating the CSI array by setting each element in the CSI array to one of a real part or an imaginary part of a respective element in a respective CSI vector of the plurality of CSI vectors, wherein:

$N_1 = 2M_tM_r$, $M_t$ is a number of the plurality of transmit antennas, $M_r$ is a number of the plurality of receive antennas, $N_2$ is a number of the plurality of sub-carriers, and $N_3$ is a number of the plurality of receive moments; and extracting a CSI sub-array of size $N_1 \times N_2 \times N_4$ from the CSI array where $1 \leq N_4 < N_3$ by:

randomly selecting $N_4$ sub-arrays of size $N_1 \times N_2$ out of $N_3$ sub-arrays of size $N_1 \times N_2$ in the CSI array; and generating the CSI sub-array by stacking $N_4$ sub-arrays.

17. The system of claim 14, wherein obtaining the mapping model comprises training a neural network by:

initializing the neural network with a plurality of initial weights; and repeating an iterative process until a termination condition is satisfied, the iterative process comprising:

extracting a training image from an output of the neural network by applying the neural network on the $i^{th}$ subset of the first plurality of CSI samples, comprising:

obtaining a first plurality of feature maps by applying a first plurality of convolutional layers of the neural network on the $i^{th}$ subset of the first plurality of CSI samples;

obtaining a second plurality of feature maps by feeding the first plurality of feature maps to an input of a fully connected layer of the neural network;

obtaining a third plurality of feature maps by applying a residual neural network (ResNet) of the neural network on the second plurality of feature maps; and upsampling the third plurality of feature maps;

generating a plurality of updated weights by minimizing a loss function of the training image and the $i^{th}$ video frame; and replacing the plurality of updated weights with the plurality of initial weights.

18. The system of claim 17, wherein:

applying the first plurality of convolutional layers comprises extracting the first plurality of feature maps from an output of a $(1, L_1)^{th}$ convolutional layer of the first plurality of convolutional layers where $L_1$ is a number of the first plurality of convolutional layers, extracting the first plurality of feature maps comprising obtaining a $(1, l_1+1)^{th}$ plurality of feature maps where $1 \leq l_1 \leq L_1$ by:

generating a $(1, l_1)^{th}$ plurality of filtered feature maps by applying a $(1, l_1)^{th}$ plurality of filters on a $(1, l_1)^{th}$ plurality of feature maps, a $(1, 1)^{st}$ plurality of feature maps comprising the $i^{th}$ subset of the first plurality of CSI samples;

generating a $(1, l_1)^{th}$ plurality of normalized feature maps by applying an instance normalization process on the $(1, l_1)^{th}$ plurality of filtered feature maps; and generating the $(1, l_1+1)^{th}$ plurality of feature maps by implementing a $(1, l_1)^{th}$ non-linear activation function on each of the $(1, l_1)^{th}$ plurality of normalized feature maps; and obtaining the second plurality of feature maps further comprises:

extracting an output vector from an output of the fully connected layer;

generating a first latent feature map by generating a matrix from a plurality of elements in the output vector;

obtaining a second latent feature map by applying a padding process on the first latent feature map;

obtaining a fourth plurality of feature maps by applying a second plurality of convolutional layers of the neural network on the second latent feature map by extracting the fourth plurality of feature maps from an output of a $(2, L_2)^{th}$ convolutional layer of the second plurality of convolutional layers where $L_2$ is a number of the second plurality of convolutional layers, extracting the fourth plurality of feature maps comprising obtaining a $(2, l_2+1)^{th}$ plurality of feature maps where $1 \leq l_2 \leq L_2$ by:

generating a $(2, l_2)^{th}$ plurality of filtered feature maps by applying a $(2, l_2)^{th}$ plurality of filters on a $(2, l_2)^{th}$ plurality of feature maps, a $(2, 1)^{st}$ plurality of feature maps comprising the second latent feature map;

generating a $(2, l_2)^{th}$ plurality of normalized feature maps by applying the instance normalization process on the $(2, l_2)^{th}$ plurality of filtered feature maps; and generating the $(2, l_2+1)^{th}$ plurality of feature maps by implementing a $(2, l_2)^{th}$ non-linear activation function on each of the $(2, l_2)^{th}$ plurality of normalized feature maps; and generating the second plurality of feature maps by applying the padding process on each of the fourth plurality of feature maps.

19. The system of claim 17, wherein:

applying the ResNet comprises applying a plurality of ResNet blocks by extracting the third plurality of feature maps from an output of an $L_r^{th}$ ResNet block of the plurality of ResNet blocks where $L_r$ is a number of the plurality of ResNet blocks, extracting the third plurality of feature maps comprising obtaining an $(l_r+1)^{th}$ plurality of residual feature maps by applying an $l_r^{th}$ ResNet block of the plurality of ResNet blocks on an $l_r^{th}$ plurality of residual feature maps where $1 \leq l_r \leq L_r$, a first plurality of residual feature maps comprising the second plurality of feature maps and the $l_r^{th}$ ResNet block comprising two cascaded convolutional layers and a residual connection; and upsampling the third plurality of feature maps comprises extracting the training image from an output of a $(3, L_3)^{th}$ convolutional layer of a third plurality of convolutional layers of the neural network where $L_3$ is a number of the third plurality of convolutional layers, extracting the training image comprising obtaining a $(3, l_3+1)^{th}$ plurality of feature maps where $1 \leq l_3 \leq L_3$ by:

generating an $l_3^{th}$ plurality of upsampled feature maps by implementing an upsampling process on a $(3, l_3)^{th}$ plurality of feature maps, a $(3, 1)^{st}$ plurality of feature maps comprising the third plurality of feature maps;

generating a $(3, l_3)^{th}$ plurality of filtered feature maps by applying a $(3, l_3)^{th}$ plurality of filters on the $l_3^{th}$ plurality of upsampled feature maps;

generating a $(3, l_3)^{th}$ plurality of normalized feature maps by applying the instance normalization process on the $(3, l_3)^{th}$ plurality of filtered feature maps; and generating the $(3, l_3+1)^{th}$ plurality of feature maps by implementing a $(3, l_3)^{th}$ non-linear activation function on each of the $(3, l_3)^{th}$ plurality of normalized feature maps.

20. The system of claim 17, wherein minimizing the loss function of the training image and the $i^{th}$ video frame comprises:

obtaining a mask image by extracting a plurality of masks from the $i^{th}$ video frame, each of the plurality of masks associated with a respective dynamic object of a plurality of dynamic objects in the $i^{th}$ video frame;

obtaining a background-subtracted image by multiplying the mask image by the $i^{th}$ video frame; and minimizing the loss function of the training image and the background-subtracted image.

* * * * *